US012775104B2

(12) United States Patent
Xiao

(10) Patent No.: US 12,775,104 B2
(45) Date of Patent: Oct. 27, 2026

(54) DATA PROCESSING METHOD AND APPARATUS, DEVICE, COMPUTER-READABLE STORAGE MEDIUM, AND COMPUTER PROGRAM PRODUCT

(71) Applicant: TENCENT TECHNOLOGY (SHENZHEN) COMPANY LTD, Shenzhen (CN)

(72) Inventor: Ning Xiao, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 129 days.

(21) Appl. No.: 18/794,177

(22) Filed: Aug. 5, 2024

(65) Prior Publication Data

US 2024/0393479 A1 Nov. 28, 2024

Related U.S. Application Data

(63) Continuation of application No. PCT/CN2023/129424, filed on Nov. 2, 2023.

(30) Foreign Application Priority Data

Dec. 26, 2022 (CN) ......................... 202211677820.5

(51) Int. Cl.
*G01S 19/00* (2010.01)
*G01S 19/39* (2010.01)
*G01S 19/47* (2010.01)

(52) U.S. Cl.
CPC ............ *G01S 19/47* (2013.01); *G01S 19/393* (2019.08)

(58) Field of Classification Search
CPC ............................... G01S 19/47; G01S 19/393
(Continued)

(56) References Cited

U.S. PATENT DOCUMENTS

2008/0269988 A1 10/2008 Feller et al.
2015/0369614 A1* 12/2015 Watanabe .............. G01C 21/26 701/468
(Continued)

FOREIGN PATENT DOCUMENTS

CN 101907714 A 12/2010
CN 112130188 A 12/2020
(Continued)

OTHER PUBLICATIONS

International Search Report for PCT/CN2023/129424, dated Dec. 13, 2023.
(Continued)

*Primary Examiner* — Erin M Piateski
*Assistant Examiner* — Michael T Dowling
(74) *Attorney, Agent, or Firm* — Sughrue Mion, PLLC

(57) ABSTRACT

A data processing method, applied to an electronic device, includes: obtaining satellite positioning information; obtaining a sensor data set captured by a target sensor in a terminal, the sensor data set including at least an acceleration sensor data set and a gyroscope data set; determining, based on the acceleration sensor data set and the gyroscope data set, yaw angle variation information of a carrier in which the terminal is located during movement; fusing the satellite positioning information and the yaw angle variation information to obtain moving trajectory information of the carrier; and displaying a moving trajectory of the carrier based on the moving trajectory information.

18 Claims, 11 Drawing Sheets

(58) Field of Classification Search
USPC .......................................................... 701/468
See application file for complete search history.

(56) References Cited

U.S. PATENT DOCUMENTS

| | | | | |
|---|---|---|---|---|
| 2018/0059667 | A1* | 3/2018 | Kuroda | G06V 20/58 |
| 2019/0206073 | A1* | 7/2019 | Huang | G06T 3/40 |
| 2020/0072617 | A1* | 3/2020 | Tanaka | G01C 21/1652 |

FOREIGN PATENT DOCUMENTS

| | | | | | |
|---|---|---|---|---|---|
| CN | 112415554 | A | | 2/2021 | |
| CN | 112859139 | A | * | 5/2021 | G01C 21/165 |
| CN | 116953760 | A | | 10/2023 | |
| JP | 2014077769 | A | * | 5/2014 | |

OTHER PUBLICATIONS

European Search Report dated Nov. 6, 2025 in Application No. EP 23 90 9649.

* cited by examiner

DATA PROCESSING METHOD AND APPARATUS, DEVICE, COMPUTER-READABLE STORAGE MEDIUM, AND COMPUTER PROGRAM PRODUCT

CROSS-REFERENCE TO RELATED APPLICATIONS

This application is a continuation application of International Application No. PCT/CN2023/129424 filed on Nov. 2, 2023, which claims priority to Chinese Patent Application No. 202211677820.5 filed with the China National Intellectual Property Administration on Dec. 26, 2022, the disclosures of each being incorporated by reference herein in their entireties.

FIELD

This application relates to the field of data processing technologies, and in particular, to a data processing method and apparatus, a device, a computer-readable storage medium, and a computer program product.

BACKGROUND

A vehicle navigation application may positioning for a user or a carrier based on a global navigation satellite system (GNSS) anchor point of a terminal as an observation input. In some scenarios, such as under an elevated highway, at an intersection or a fork, or at a low speed, for example, the anchor point may drift or jump or be discontinuous. Consequently, the anchor point may freeze, turning may be unsmooth, and false yawing may be triggered, which may affect the accuracy of path planning.

SUMMARY

Provided are a data processing method and apparatus, a device, a computer-readable storage medium, and a computer program product, capable of determining a positioning trajectory.

According to some embodiments, a data processing method, applied to an electronic device, includes: obtaining satellite positioning information; obtaining a sensor data set captured by a target sensor in a terminal, the sensor data set including at least an acceleration sensor data set and a gyroscope data set; determining, based on the acceleration sensor data set and the gyroscope data set, yaw angle variation information of a carrier in which the terminal is located during movement; fusing the satellite positioning information and the yaw angle variation information to obtain moving trajectory information of the carrier; and displaying a moving trajectory of the carrier based on the moving trajectory information.

According to some embodiments, a data processing apparatus, includes: at least one memory configured to store computer program code; and at least one processor configured to read the program code and operate as instructed by the program code, the program code including: first obtaining code configured to cause at least one of the at least one processor to obtain satellite positioning information; second obtaining code configured to cause at least one of the at least one processor to obtain a sensor data set captured by a target sensor in a terminal, the sensor data set including at least an acceleration sensor data set and a gyroscope data set; first determining code configured to cause at least one of the at least one processor to determine, based on the acceleration sensor data set and the gyroscope data set, yaw angle variation information of a carrier in which the terminal is located during movement; first fusion code configured to cause at least one of the at least one processor to fuse the satellite positioning information and the yaw angle variation information to obtain moving trajectory information of the carrier; and display code configured to cause at least one of the at least one processor to display a moving trajectory of the carrier based on the moving trajectory information.

According to some embodiments, a non-transitory computer-readable storage medium, storing computer code which, when executed by at least one processor, causes the at least one processor to at least: obtain satellite positioning information; obtain a sensor data set captured by a target sensor in a terminal, the sensor data set including at least an acceleration sensor data set and a gyroscope data set; determine, based on the acceleration sensor data set and the gyroscope data set, yaw angle variation information of a carrier in which the terminal is located during movement; fuse the satellite positioning information and the yaw angle variation information to obtain moving trajectory information of the carrier; and display a moving trajectory of the carrier based on the moving trajectory information.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

Figure 1:
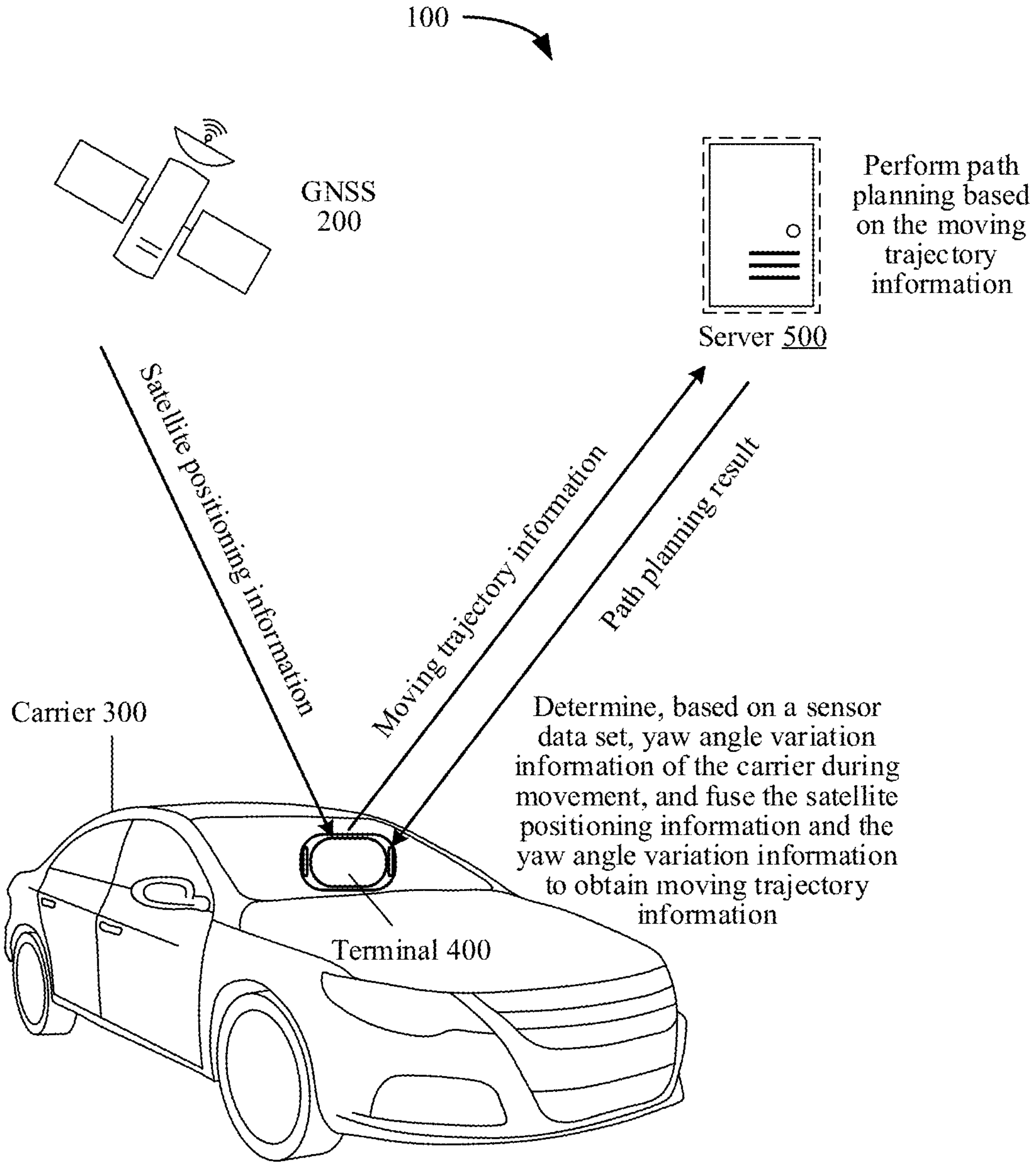
FIG. 1 is a schematic structural diagram of an architecture of a data processing system according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

In the following descriptions, the terms "first", "second", and "third" are merely intended to distinguish between similar objects rather than describe an order of objects. It can be understood that the "first", "second", and "third" are interchangeable in order in proper circumstances, so that some embodiments described herein can be implemented in an order other than the order illustrated or described herein.

Unless otherwise defined, meanings of technical and scientific terms are the same as those understood by a person skilled in the art. The terms used are merely intended to describe some embodiments and are not intended to limit the disclosure.

Before some embodiments are further described in detail, terms in some embodiments are described, and the following explanations are applicable to the terms in some embodiments.

(1) A GNSS is a space-based radio navigation and positioning system capable of providing a user with all-weather three-dimensional coordinates and velocity and time information at any place on the Earth's surface or in terrestrial space. The GNSS includes one or more satellite constellations and an augmentation system.

(2) A circular error probable (CEP) is a probability of falling within a circle that is drawn with a target as a center and with a radius of r, and may be denoted as CEPXX, XX being a number indicating a probability. For example, a CEP95 of positioning accuracy being 5 m means that, a probability that an actual anchor point falls within a circle with a given anchor point as a center and with a radius of 5 m is 95%.

(3) A micro-electro-mechanical system (MEMS) is a micro-device or a micro-system that can integrate a micro-mechanism, a micro-sensor, a micro-actuator, a signal processing and control circuit, an interface, communication, and a power supply.

Some embodiments provide a data processing method and apparatus, a device, a computer-readable storage medium, and a computer program product, to resolve a problem in the related art that positioning is inaccurate when carrier positioning is performed based only on a GNSS anchor point of a mobile phone. The following describes an electronic device according to some embodiments. The device provided in some embodiments may be implemented as various types of user terminals, for example, a notebook computer, a tablet computer, a desktop computer, a set-top box, or a mobile device (for example, a mobile phone, a portable music player, a personal digital assistant, a dedicated messaging device, a portable gaming device, or an in-vehicle device), or may be implemented as a server. The following describes the device being implemented as a terminal according to some embodiments.

FIG. 1 is a schematic architectural diagram of a data processing system 100 according to some embodiments. As shown in FIG. 1, the data processing system includes a GNSS 200, a carrier 300, a terminal 400, and a server 500. The terminal 400 is placed in the carrier 300. The terminal 400 and the GNSS 200 are connected through a network. The network may be a wide area network, a local area network, or a combination of the two.

When the terminal 400 is used for path planning or navigation, the terminal 400 first obtains its own satellite positioning information and a sensor data set captured by its own target sensor, the sensor data set including at least an acceleration sensor data set and a gyroscope data set; determines, based on the acceleration sensor data set and the gyroscope data set, yaw angle variation information of the carrier 300 in which the terminal is located during movement; and finally, fuses the satellite positioning information and the yaw angle variation information to obtain moving trajectory information of the carrier. The terminal 400 transmits the moving trajectory information of the carrier to the server 500. The server 500 performs path planning based on the moving trajectory information of the carrier and destination information to obtain a path planning result. The server 500 transmits the path planning result to the terminal 400. The terminal 400 displays the path planning result.

During the path planning, the server 500 uses the moving trajectory information that is obtained by fusing the satellite positioning information and the yaw angle variation information. The moving trajectory information may combine absolute positioning accuracy of the GNSS and local relative positioning accuracy of the sensor, and therefore may have higher accuracy. This may improve accuracy of the path planning and may avoid yawing or mis-navigation.

In some embodiments, the server 500 may be an independent physical server, or may be a server cluster or a distributed system that includes a plurality of physical servers, or may be a cloud server that provides cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The terminal 400 may be a smartphone, a tablet computer, a notebook computer, a desktop computer, a smart speaker, a smartwatch, an in-vehicle terminal, or the like, but is not limited thereto. The terminal and the server may be directly or indirectly connected through wired or wireless communication.

Figure 2:
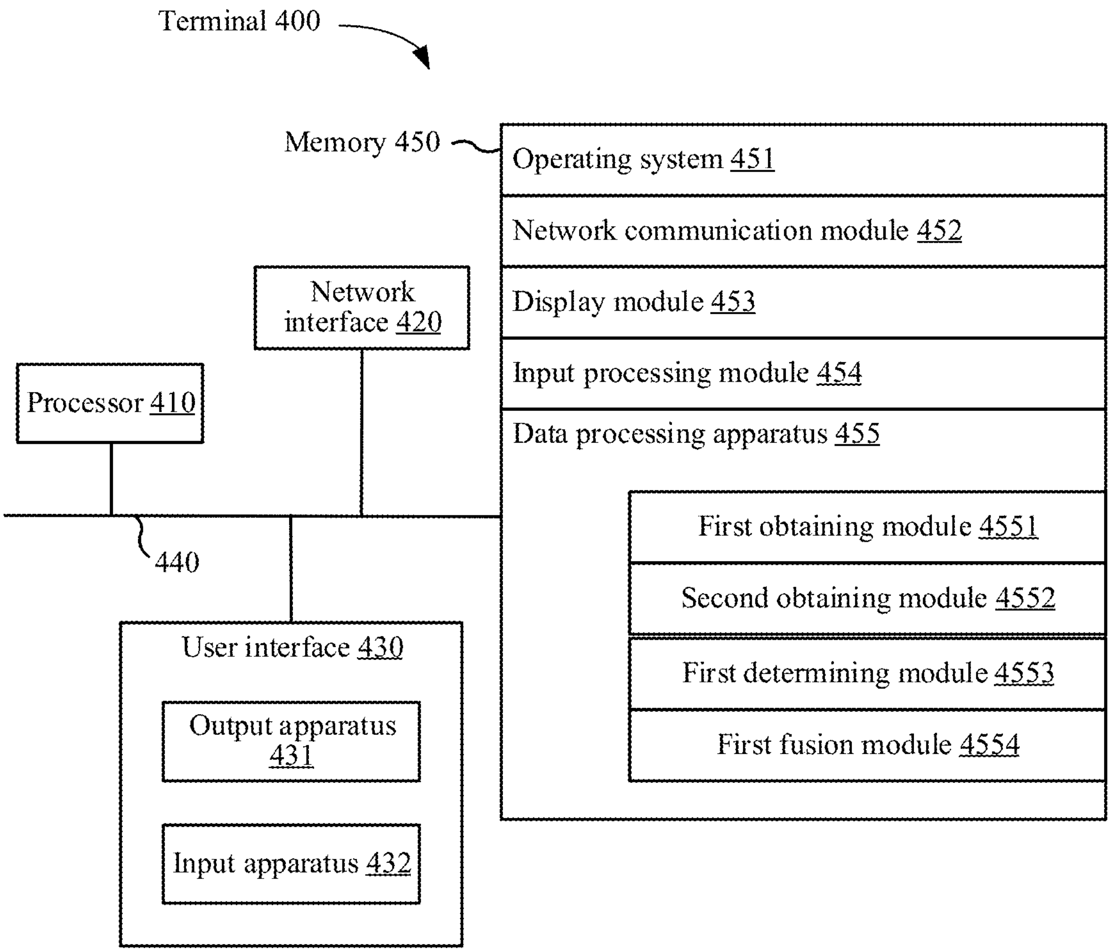
FIG. 2 is a schematic structural diagram of an apparatus according to some embodiments.

FIG. 2 is a schematic structural diagram of a terminal 400 according to some embodiments. The terminal 400 shown in FIG. 2 includes at least one processor 410, a memory 450, at least one network interface 420, and a user interface 430. The components of the terminal 400 are coupled together through a bus system 440. The bus system 440 is configured to implement connection and communication between the components. In addition to a data bus, the bus system 440 further includes a power bus, a control bus, and a state signal bus. However, for ease of clear description, all types of buses in FIG. 2 are marked as the bus system 440.

The processor 410 may be an integrated circuit chip with a signal processing capability, for example, a central processing unit (CPU), a digital signal processor (DSP), another programmable logic device, a discrete gate or transistor logic device, or a discrete hardware component. The processor may be a microprocessor or the like.

The user interface 430 includes one or more output apparatuses 431 capable of displaying media content, including one or more speakers and/or one or more visual display screens. The user interface 430 further includes one or more input apparatuses 432, including user interface components for facilitating user input, for example, a keyboard, a mouse, a microphone, a touch display screen, a camera, or another input button or control.

The memory 450 may be a removable memory, a non-removable memory, or a combination thereof. Exemplary hardware devices include a solid-state memory, a hard disk drive, an optical disc drive, and the like. In some embodiments, the memory 450 includes one or more storage devices physically located away from the processor 410.

The memory 450 includes a volatile memory or a non-volatile memory, or may include both a volatile memory and a non-volatile memory. The non-volatile memory may be a read-only memory (ROM). The volatile memory may be a random access memory (RAM); however, the disclosure is not limited thereto.

In some embodiments, the memory 450 is capable of storing data to support various operations. Examples of the data include a program, a module, and a data structure or a subset or superset thereof. Examples are described below:

- an operating system 451, including system programs for processing various system services and performing hardware-related tasks, for example, a framework layer, a core library layer, and a driver layer for implementing various services and processing hardware-based tasks;
- a network communication module 452, configured to reach another electronic device through one or more (wired or wireless) network interfaces 420, exemplary network interfaces 420 including Bluetooth, wireless fidelity (Wi-Fi), universal serial bus (USB), and the like;
- a display module 453, configured to display information by using one or more output apparatuses 431 (for example, a display screen or a speaker) associated with the user interface 430 (for example, a user interface for operating a peripheral device and displaying content and information); and
- an input processing module 454, configured to detect one or more user inputs or interactions from one or more input apparatuses 432 and translate the detected inputs or interactions.

In some embodiments, an apparatus provided in some embodiments may be implemented by using software. FIG. 2 shows a data processing apparatus 455 stored in the memory 450. The apparatus may be software in the form of a program or a plug-in, and includes the following software modules: a first obtaining module 4551, a second obtaining module 4552, a first determining module 4553, and a first fusion module 4554. These modules are logical modules, and therefore may be flexibly combined or further split based on an implemented function. Functions of the modules are described below.

In some embodiments, the apparatus provided in some embodiments may be implemented by using hardware. In an example, the apparatus provided in some embodiments may be a processor in the form of a hardware decoding processor, and is programmed to perform the data processing method provided in some embodiments. For example, the processor in the form of the hardware decoding processor may be one or more application-specific integrated circuits (ASICs), DSPs, programmable logic devices (PLDs), complex programmable logic devices (CPLDs), field programmable gate arrays (FPGAs), or other electronic elements.

In some embodiments, the terminal or the server may implement the data processing method provided in some embodiments by running a computer program. For example, the computer program may be a native program or software module in an operating system. The computer program may be a native application (APP), for example, a program that is to be installed in an operating system to run, for example, a map APP; or may be a mini program, for example, a program that is to be downloaded to a browser environment to run; or may be a mini program that can be embedded in any APP. The computer program may be an application, a module, or a plug-in, for example.

The data processing method provided in some embodiments is described with reference to the terminal provided in some embodiments.

The following describes the data processing method provided in some embodiments. As described above, the electronic device for implementing the data processing method may be a user terminal placed in a carrier, an edge computing device in a carrier, or a combination of the two.

Figure 3A:
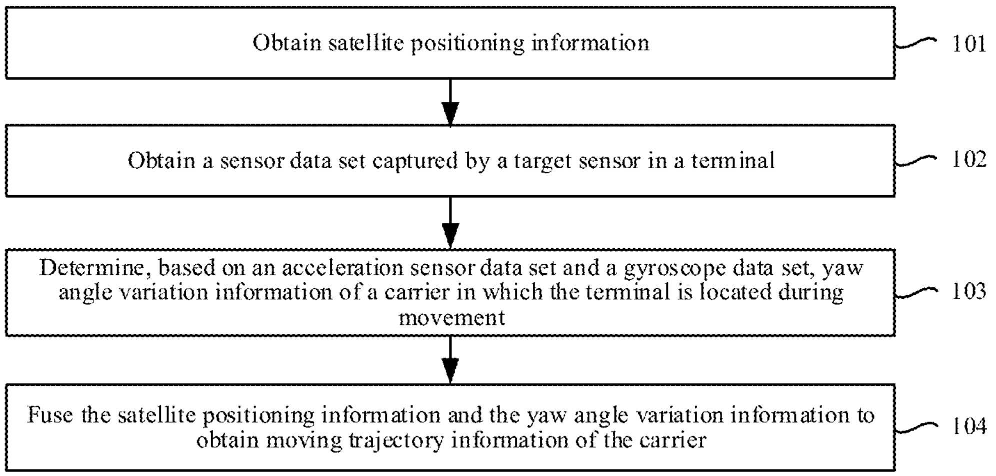
FIG. 3A is a schematic flowchart of a data processing method according to some embodiments.

FIG. 3A is a schematic flowchart of a data processing method according to some embodiments. The method is described with reference to operations shown in FIG. 3A.

Operation 101: Obtain satellite positioning information.

In some embodiments, the obtained satellite positioning information can represent a position and a moving speed of a carrier. The carrier may be a car, an electric bicycle, a motorcycle, a drone, or the like. The satellite positioning information may be satellite positioning information of an intelligent terminal placed in the carrier, satellite positioning information of a navigation device that comes with the carrier, or satellite positioning information of a positioning module with a positioning function in the carrier.

The satellite positioning information includes at least position information and velocity information of the carrier in which the terminal is located. In some embodiments, the satellite positioning information further includes an accuracy estimate. The position information may include longitude data and latitude data. The velocity information may include a rate and a direction. The direction in the velocity information may be represented by a value within [0, 360). For example, 0° indicates a due north direction, 45° indicates a northeast direction, 90° indicates a due east direction, 180° indicates a due south direction, and 270° indicates a due west direction.

The accuracy estimate in the satellite positioning information is configured for representing a difference between the position information in the satellite positioning information and a real position of the carrier. In some embodiments, the accuracy estimate in the satellite positioning information may be obtained by performing prediction by using a trained accuracy estimation model based on a quantity of satellites, satellite mass, historical trajectory information, and other data.

In some embodiments, the satellite positioning information may be obtained at a first frequency. For example, the first frequency may be 1 Hz or 2 Hz.

When the data processing method provided in some embodiments is implemented by an intelligent terminal placed in a carrier and the satellite positioning information is satellite positioning information of the intelligent terminal, operation 101 may be implemented as follows: The intelligent terminal obtains satellite positioning information transmitted by a GNSS. When the data processing method provided in some embodiments is implemented by an intelligent terminal placed in a carrier and the satellite positioning information is satellite positioning information of the carrier, operation 101 may be implemented as follows: The intelligent terminal receives satellite positioning information of a positioning module in the carrier or a navigation device in the carrier. When the data processing method provided in some embodiments is implemented by an edge computing device in a carrier and the satellite positioning information is satellite positioning information of an intelligent terminal, data communication may be performed between the edge computing device and the intelligent terminal, between the intelligent terminal and a positioning device of the carrier, between the intelligent terminal and a navigation device of the carrier, between the edge computing device and the positioning device of the carrier, and between the edge computing device and the navigation device of the carrier through a network (for example, an in-vehicle local area network or a wireless network) or a short-range communication technology. The edge computing device receives the satellite positioning information of the intelligent terminal. When the data processing method provided in some embodiments is implemented by an edge computing device in a carrier and the satellite positioning information is satellite positioning information of the carrier, operation 101 is implemented as follows: The edge computing device receives satellite positioning information of a positioning module of the carrier or a navigation device of the carrier.

Operation 102: Obtain a sensor data set captured by a target sensor in the terminal.

The terminal may be an intelligent user terminal placed in the carrier, for example, a mobile phone or a tablet computer, or may be an in-vehicle terminal that comes with the carrier. The target sensor includes at least an acceleration sensor and a gyroscope. In some embodiments, the target sensor may further include a magnetic sensor. Correspondingly, the sensor data set includes at least an acceleration sensor data set and a gyroscope data set. In some embodiments, the sensor data set may further include a magnetic sensor data set.

In some embodiments, readings in the target sensor may be captured at regular intervals, and captured timestamps and captured sensor readings may be added to the sensor data set. The acceleration sensor data set includes a plurality of capture timestamps and corresponding acceleration sensor reading values. The gyroscope data set includes a plurality of timestamps and corresponding gyroscope reading values.

Operation 103: Determine, based on the acceleration sensor data set and the gyroscope data set, yaw angle variation information of the carrier in which the terminal is located during movement.

Figure 3B:
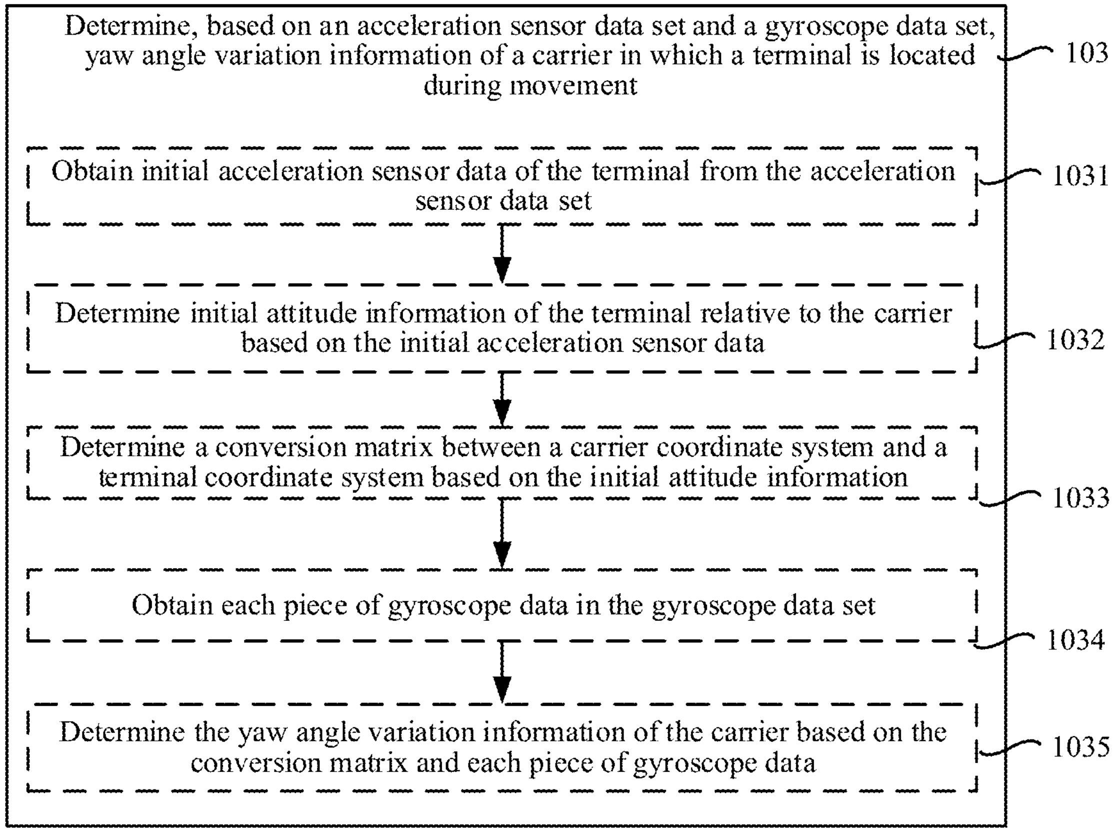
FIG. 3B is a schematic diagram of an implementation process of determining yaw angle variation information according to some embodiments.

In some embodiments, the carrier in which the terminal is located may be a car, an electric bicycle, a motorcycle, a drone, or the like. As shown in FIG. 3B, operation 103 shown in FIG. 3A may be implemented by the following operation 1031 to operation 1035. Details are described below.

Operation 1031: Obtain initial acceleration sensor data of the terminal from the acceleration sensor data set.

Because the acceleration sensor data set includes a plurality of pieces of acceleration sensor data, the initial acceleration sensor data is acceleration sensor data that is in the acceleration sensor data set and whose capture timestamp has a longest time interval from a current moment. The initial acceleration sensor data includes initial X-axis acceleration sensor data, initial Y-axis acceleration sensor data, and initial Z-axis acceleration sensor data.

Operation 1032: Determine initial attitude information of the terminal relative to the carrier based on the initial acceleration sensor data.

In some embodiments, the initial attitude information includes an initial pitch angle, an initial roll angle, and an initial heading angle. Because a vector sum obtained based on the acceleration sensor is a gravity acceleration g, a formula (1-1)$^{th}$ may be obtained through calculation:

$$\begin{bmatrix} a_x \\ a_y \\ a_z \end{bmatrix} = \begin{bmatrix} -g*\cos(x_0)*\sin(y_0) \\ g\ \sin(x_0) \\ g*\cos(x_0)*\cos(y_0) \end{bmatrix}, \tag{1-1}$$

where $a_x$ is the initial X-axis acceleration sensor data, $a_y$ is the initial Y-axis acceleration sensor data, $a_z$ is the initial Z-axis acceleration sensor data, $x_0$ is the initial pitch angle, $y_0$ is the initial roll angle, g is the gravity acceleration, and $$|g| = \sqrt[2]{a_x^2 + a_y^2 + a_z^2}.$$

Based on the formula (1-1), operation 1032 may be implemented as follows: The initial pitch angle of the terminal relative to the carrier is determined based on the initial X-axis acceleration sensor data, the initial Y-axis acceleration sensor data, and the initial Z-axis acceleration sensor data, and the initial roll angle of the terminal relative to the carrier is determined based on the initial X-axis acceleration sensor data and the initial Z-axis acceleration sensor data.

The initial pitch angle may be obtained based on a formula (1-2):

$$x_0 = \arcsin\frac{a_y}{\sqrt[2]{a_x^2 + a_y^2 + a_z^2}}; \tag{1-2}$$

and the initial roll angle may be obtained based on a formula (1-3):

$$y_0 = \arctan\frac{-a_x}{a_z}. \tag{1-3}$$

In some embodiments, the yaw angle variation information, for example, a difference between heading angles at two adjacent moments, of the carrier may be calculated. Therefore, regardless of a value of an initial yaw angle, the obtained yaw angle variation information is consistent. Therefore, a preset initial yaw angle of the terminal relative to the carrier may be directly obtained. This may improve data processing efficiency while ensuring processing accuracy. Finally, the initial pitch angle, the initial roll angle, and the initial yaw angle may be determined as the initial attitude information.

Operation 1033: Determine a conversion matrix between a carrier coordinate system and a terminal coordinate system based on the initial attitude information.

In some embodiments, first, a first rotation matrix corresponding to an X-axis is determined based on the initial pitch angle, a second rotation matrix corresponding to a Y-axis is determined based on the initial roll angle, and a third rotation matrix corresponding to a Z axis is determined based on the initial yaw angle. A product of the third rotation matrix, the second rotation matrix, and the first rotation matrix is determined as the conversion matrix between the carrier coordinate system and the terminal coordinate system.

The first rotation matrix $R_x$ may be obtained based on a formula (1-4):

$$R_x = \begin{bmatrix} 1 & 0 & 0 \\ 0 & \cos(x_0) & -\sin(x_0) \\ 0 & \sin(x_0) & \cos(x_0) \end{bmatrix}, \tag{1-4}$$

where $x_0$ is the initial pitch angle, sin( ) is a sine function, and cos( ) is a cosine function.

The second rotation matrix $R_y$ may be obtained based on a formula (1-5):

$$R_y = \begin{bmatrix} \cos(y_0) & 0 & \sin(y_0) \\ 0 & 1 & 0 \\ -\sin(y_0) & 0 & \cos(y_0) \end{bmatrix}, \tag{1-5}$$

where $y_0$ is the initial roll angle.

The third rotation matrix $R_z$ may be obtained based on a formula (1-6):

$$R_z = \begin{bmatrix} \cos(z_0) & -\sin(z_0) & 0 \\ \sin(z_0) & \cos(z_0) & 0 \\ 0 & 0 & 1 \end{bmatrix}, \tag{1-6}$$

where $z_0$ is the initial yaw angle.

The conversion matrix between the carrier coordinate system and the terminal coordinate system may be obtained based on a formula (1-7):

$$C_v^c = R_z * R_y * R_x, \tag{1-7}$$

$C_v^c$ is the conversion matrix between the carrier coordinate system and the terminal coordinate system.

Operation 1034: Obtain each piece of first gyroscope data in the gyroscope data set.

In some embodiments, each piece of first gyroscope data in the gyroscope data set may be obtained at a second frequency. The second frequency may be 10 Hz, 20 Hz, or the like. The first frequency is less than the second frequency. This can ensure that a plurality of pieces of first gyroscope data are captured between two adjacent satellite timestamps, and further ensure that a plurality of pieces of yaw angle variation data exist between two adjacent satellite timestamps and a plurality of target trajectory points are included between two pieces of satellite positioning data, to avoid freezing and unsmoothness caused by insufficient GNSS positioning accuracy.

Operation 1035: Determine the yaw angle variation information of the carrier based on the conversion matrix and each piece of first gyroscope data.

Figure 3C:
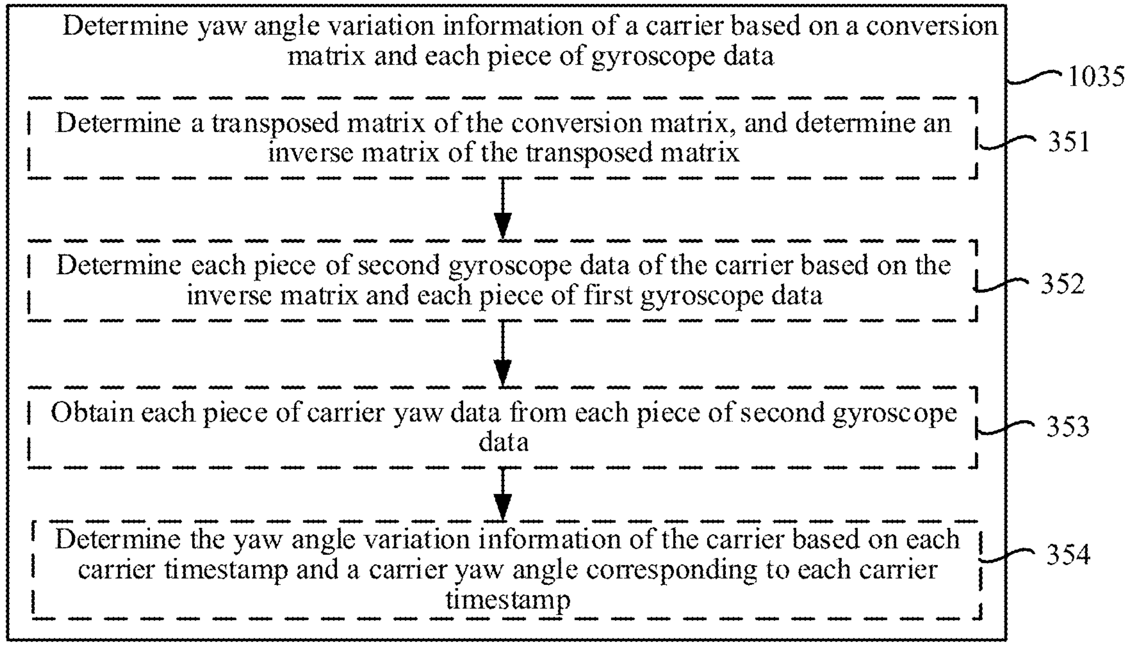
FIG. 3C is a schematic diagram of an implementation process of determining yaw angle variation information of a carrier based on a conversion matrix and first gyroscope data according to some embodiments.

In some embodiments, as shown in FIG. 3C, operation 1035 in FIG. 3B may be implemented by operation 351 to operation 354 shown in FIG. 3C. The operations are described below with reference to FIG. 3C.

Operation 351: Determine a transposed matrix of the conversion matrix, and determine an inverse matrix of the transposed matrix.

The conversion matrix has 3×3 dimensions. In some embodiments, the conversion matrix is first transposed to obtain the transposed matrix of the conversion matrix, and the inverse matrix of the transposed matrix of the conversion matrix may be determined by using an adjoint matrix method or elementary row (column) transformation. The inverse matrix also has 3×3 dimensions.

Operation 352: Determine each piece of second gyroscope data of the carrier based on the inverse matrix and each piece of first gyroscope data.

In some embodiments, each piece of first gyroscope data of the terminal includes each timestamp at which first gyroscope data is captured and a gyroscope reading value corresponding to each timestamp. Each gyroscope reading value includes three values. The three pieces of data may constitute a 3×1 column vector corresponding to the first gyroscope data. Operation 352 may be implemented as follows: A product of the inverse matrix and a column vector corresponding to each piece of first gyroscope data is determined as a gyroscope reading value of the carrier. The gyroscopic value of the carrier includes three-axis gyroscope rotation angles ($gyr'_x$, $gyr'_y$, $gyr'_z$) in the carrier coordinate system. The gyroscope reading value of the carrier and a carrier timestamp corresponding to the gyroscope reading value are determined as the second gyroscope data of the carrier.

Operation 353: Obtain each piece of carrier yaw data from each piece of second gyroscope data.

In some embodiments, each carrier timestamp in each piece of second gyroscope data of the carrier and a Z-axis rotation angle $gyr'_z$, for example, a carrier yaw angle, corresponding to each carrier timestamp are obtained. The carrier yaw data includes each carrier timestamp and a carrier yaw angle corresponding to each carrier timestamp.

Operation 354: Determine the yaw angle variation information of the carrier based on each carrier timestamp and the carrier yaw angle corresponding to each carrier timestamp.

In some embodiments, it is assumed that carrier timestamps are $t_1$, $t_2$, $t_3$, . . . , carrier yaw angles respectively corresponding to the carrier timestamps are $gyr'_{z1}$, $gyr'_{z2}$, $gyr'_{z2}$, . . . , and the carrier yaw angle variation information includes the carrier timestamps and yaw angle variation angles respectively corresponding to the carrier timestamps. A yaw angle variation angle corresponding to a carrier timestamp $t_k$ is a difference between a carrier yaw angle corresponding to $t_k$ and a carrier yaw angle corresponding to $t_{k-1}$: $gyr'_{zk}-gyr'_{z(k-1)}$. The yaw angle variation angle may be a positive number or a negative number.

In operation 1031 to operation 1035, the initial attitude information of the terminal relative to the carrier in which the terminal is located may be determined based on the condition that the vector sum of three-dimensional X-axis, Y-axis, and Z-axis accelerations of the acceleration sensor is the gravity acceleration. The conversion matrix between the terminal coordinate system and the carrier coordinate system is determined based on the initial attitude information. A carrier yaw angle is determined based on the conversion matrix and a reading of the gyroscope in the terminal, and a yaw angle variation angle of the carrier is determined, to provide data for determining a moving trajectory of the carrier.

Still refer to FIG. 3A. Operations after operation 103 are described.

Operation 104: Fuse the satellite positioning information and the yaw angle variation information to obtain moving trajectory information of the carrier.

Figure 4A:
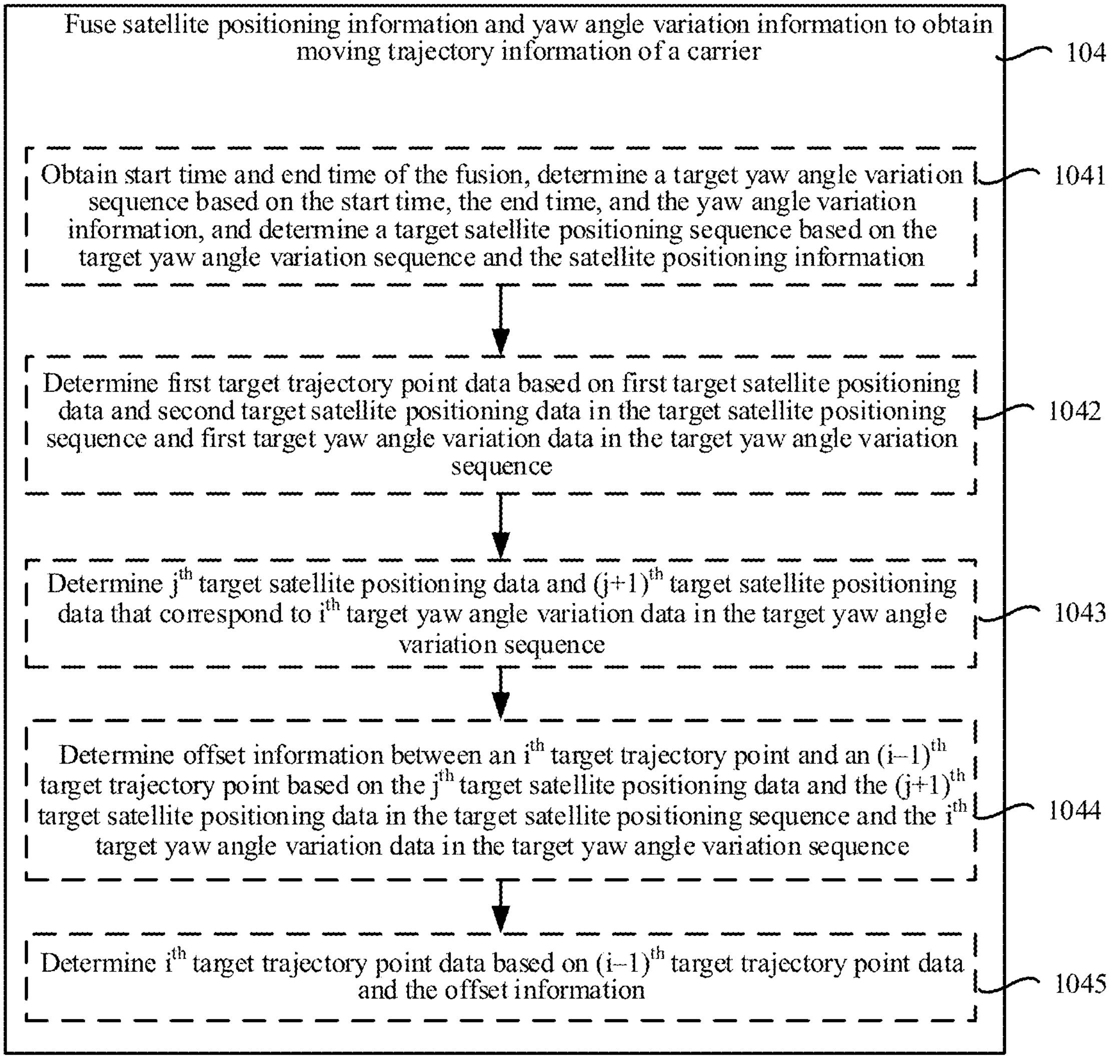
FIG. 4A is a schematic diagram of an implementation process of determining moving trajectory information of a carrier according to some embodiments.

In some embodiments, as shown in FIG. 4A, operation 104 shown in FIG. 3A may be implemented by operation 1041 to operation 1045 shown in FIG. 4A. The operations are described below with reference to FIG. 4A.

Operation 1041: Obtain start time and end time of the fusion, determine a target yaw angle variation sequence based on the start time, the end time, and the yaw angle variation information, and determine a target satellite positioning sequence based on the target yaw angle variation sequence and the satellite positioning information.

The data processing method provided in some embodiments may be used as an additional function of an electronic map application. A prompt for enabling the function may be given during navigation when it is determined that satellite signal quality is poor, or the function is set to remain enabled during navigation, and the function is disabled after the navigation ends. In some embodiments, enabling time and disabling time of the function may be set manually. Therefore, when it is determined, during navigation, that the function corresponding to the data processing method is enabled, enabling time is determined as the start time of the fusion, and disabling time of the function is determined as the end time. If no disabling time of the function is preset, a currently latest timestamp may be determined as the end time.

In some embodiments, the determining a target yaw angle variation sequence based on the start time, the end time, and the yaw angle variation information may be implemented as follows: A first target carrier timestamp with a shortest time interval from the start time is determined from the yaw angle variation information, a second target carrier timestamp with a shortest time interval from the end time is determined, and yaw angle variation data between the first target carrier timestamp and the second target carrier timestamp is determined as the target yaw angle variation sequence. During the determining of the target satellite positioning sequence, a first target satellite timestamp that is earlier than the first target carrier timestamp and that has a shortest time interval from the first target carrier timestamp is determined from the satellite positioning information, and satellite positioning data corresponding to a second target satellite timestamp that is later than the first target satellite timestamp and earlier than the end time is determined as the target satellite positioning sequence.

Operation 1042: Determine first target trajectory point data based on first target satellite positioning data and second target satellite positioning data in the target satellite positioning sequence and first target yaw angle variation data in the target yaw angle variation sequence.

Figure 4B:
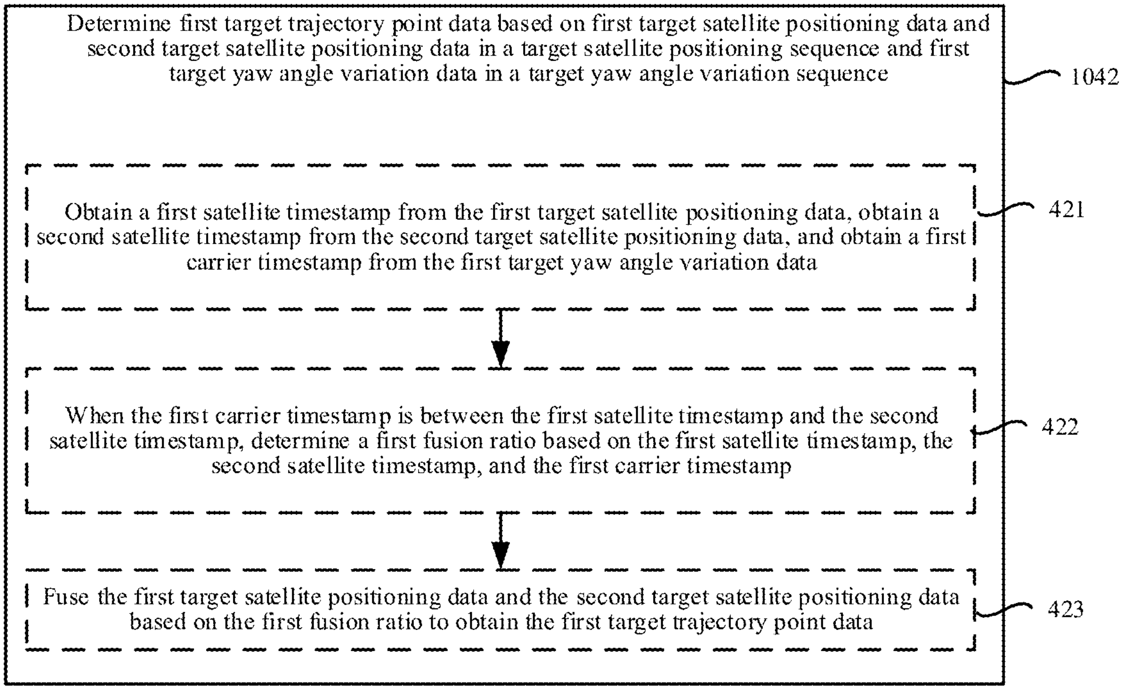
FIG. 4B is a schematic diagram of an implementation process of determining first target trajectory point data according to some embodiments.

In some embodiments, as shown in FIG. 4B, operation 1042 shown in FIG. 4A may be implemented by operation 421 to operation 423 shown in FIG. 4B. The operations are described below with reference to FIG. 4B.

Operation 421: Obtain a first satellite timestamp from the first target satellite positioning data, obtain a second satellite timestamp from the second target satellite positioning data, and obtain a first carrier timestamp from the first target yaw angle variation data.

In some embodiments, satellite positioning data is a four-tuple, including a satellite timestamp, position information, velocity information, and an accuracy estimate. The position information includes a longitude and a latitude. The velocity information includes a rate and a direction. The accuracy estimate may be represented by a CEP. Yaw angle variation data is a two-tuple, including a carrier timestamp and a yaw angle variation. After the first target satellite positioning data and the second satellite positioning data are obtained, the first satellite timestamp and the second satellite timestamp may be obtained correspondingly. Similarly, the first carrier timestamp may be obtained from the first target yaw angle variation data.

Operation 422: When the first carrier timestamp is between the first satellite timestamp and the second satellite timestamp, determine a first fusion ratio based on the first satellite timestamp, the second satellite timestamp, and the first carrier timestamp.

In the case of the first satellite timestamp<the first carrier timestamp<the second satellite timestamp, the first carrier timestamp is between the first satellite timestamp and the second satellite timestamp. In this case, the first fusion ratio $R_1$ may be determined based on a formula (1-8):

$$R_1 = \frac{Y[1].t - G[1].t}{G[2].t - G[1].t}, \tag{1-8}$$

where $Y[1].t$ is the first carrier timestamp, $G[1].t$ is the first satellite timestamp, $G[2].t$ is the second satellite timestamp, and the first fusion ratio is a real number between 0 and 1.

Operation 423: Fuse the first target satellite positioning data and the second target satellite positioning data based on the first fusion ratio to obtain the first target trajectory point data.

In some embodiments, the fusion performed on the first target satellite positioning data and the second target satellite positioning data includes position information fusion, rate fusion, and direction fusion, which are separately described below.

Position fusion: First position information in the first target satellite positioning data and second position information in the second target satellite positioning data are fused based on the first fusion ratio to obtain position information of a first target trajectory point.

Because position information includes a longitude and a latitude, longitudes and latitudes may be separately fused during the position fusion. In some embodiments, a longitude in the first position information and a longitude in the second position information may be fused based on a formula (1-9):

$$NewPot_1.p.lon = (1 - R_1) \times G[1].p.lon + R_1 \times G[2].p.lon, \quad (1-9)$$

where

G[1].p.lon is the longitude in the first position information, G[2].p.lon is the longitude in the second position information, and $NewPot_1$.p.lon is a longitude of the first target trajectory point.

In some embodiments, a latitude in the first position information and a latitude in the second position information are fused based on a formula (1-10):

$$NewPot[1].p.lat = (1-R_1) \times G[1].p.lat + R_1 \times G[2].p.lat, \quad (1-10)$$

where

G[1].p.lat is the latitude in the first position information, G[2].p.lat is the latitude in the second position information, and NewPot[1].p.lat is a latitude of the first target trajectory point.

Rate fusion: A first rate in the first target satellite positioning data and a second rate in the second target satellite positioning data are fused based on the first fusion ratio to obtain a target rate of the first target trajectory point.

In some embodiments, the first rate in the first target satellite positioning data and the second rate in the second target satellite positioning data are fused based on a formula (1-11):

$$NewPot[1].v.\text{value} = (1 - R_1) \times G[1].v.\text{value} + R_1 \times G[2].v.\text{value}, \quad (1-11)$$

where

G[1].v.value is the first rate in the first target satellite positioning data, G[2].v.value is the second rate in the second target satellite positioning data, and NewPot[1].v.value is the target rate of the first target trajectory point.

Direction fusion: First direction information is obtained from the first target satellite positioning data, and second direction information is obtained from the second target satellite positioning data. First direction difference information is determined based on the first direction information, the second direction information, and the first fusion ratio. Velocity direction information of the first target trajectory point is determined based on the second direction information and the first direction difference information.

In some embodiments, the first direction difference information may be obtained by multiplying a difference between the first direction information and the second direction information by the first fusion ratio. The difference between the first direction information and the second direction information represents a rotation angle from the first direction information to the second direction information, clockwise rotation corresponding to a positive direction, and counterclockwise rotation corresponding to a negative direction. For example, the first direction information is 90°, and the second direction information is 45°. Because counterclockwise rotation of 45° may be used for rotating from 90° to 45°, the difference between the first direction information and the second direction information is −45°. During practical implementation, the difference between the first direction information and the second direction information may be obtained by subtracting the first direction information from the second direction information.

A sum of the second direction information and the first direction difference information is determined to obtain a candidate velocity direction, and whether the candidate velocity direction is greater than 360° or less than 0° is determined. If the candidate velocity direction is greater than 360°, 360° is subtracted from the candidate velocity direction to obtain the velocity direction information of the first target trajectory point. If the candidate velocity direction is less than 0°, 360° is added to the candidate velocity direction to obtain the velocity direction information of the first target trajectory point. If the candidate velocity direction is greater than 0° and less than 360°, the candidate velocity direction is determined as the velocity direction information of the first target trajectory point.

In operation 421 to operation 423, the first fusion ratio is first determined based on the first satellite timestamp obtained from the first target satellite positioning data, the second satellite timestamp obtained from the second target satellite positioning data, and the first carrier timestamp obtained from the first target yaw angle variation data, and the first target satellite positioning data and the second target satellite positioning data are fused based on the first fusion ratio to determine the position information of the first target trajectory point, to provide a position reference for determining a second target trajectory point.

Still refer to FIG. 4A. Operations after operation 1042 are described.

Operation 1043: Determine $j^{th}$ target satellite positioning data and $(j+1)^{th}$ target satellite positioning data that correspond to $i^{th}$ target yaw angle variation data in the target yaw angle variation sequence.

i=2, 3, . . . , N, N is a total quantity of yaw angle variations in the target yaw angle variation sequence, and j is an integer less than or equal to i. An $i^{th}$ carrier timestamp corresponding to the $i^{th}$ target yaw angle variation data is between a $j^1$ satellite timestamp corresponding to the $j^{th}$ target satellite positioning data and a $(j+1)^{th}$ satellite timestamp corresponding to the $(j+1)^{th}$ target satellite positioning data.

In some embodiments, during the determining of the $j^{th}$ target satellite positioning data corresponding to the $i^{th}$ target yaw angle variation data in the target yaw angle variation sequence, the $j^{th}$ target satellite positioning data corresponding to the $j^{th}$ satellite timestamp that is earlier than the $i^{th}$ carrier timestamp and that has a shortest time interval from the $i^{th}$ carrier timestamp, and the $(j+1)^{th}$ target satellite positioning data corresponding to the $(j+1)^{th}$ satellite timestamp later than the $j^{th}$ satellite timestamp may be determined from the target satellite positioning sequence.

A time interval between two adjacent pieces of target satellite positioning data is greater than a time interval between two adjacent pieces of target yaw angle variation data. A plurality of pieces of target yaw angle variation data may exist between two adjacent pieces of target satellite positioning data. Therefore, different target yaw angle variation data may correspond to the same $j^{th}$ target satellite positioning data and the same $(j+1)^{th}$ target satellite positioning data.

For example, the time interval between two adjacent pieces of target satellite positioning data is 50 milliseconds, and the time interval between two adjacent pieces of target yaw angle variation data is 10 milliseconds. It is assumed that a carrier timestamp corresponding to second target yaw angle variation data is 20:53:35:010, Dec. 8, 2021, the second target yaw angle variation data corresponds to first target satellite positioning data and second target satellite positioning data, a satellite timestamp corresponding to the first target satellite positioning data is 20:53:35:005, Dec. 8, 2021, and a satellite timestamp corresponding to the second target satellite positioning data is 20:53:35:055, Dec. 8, 2021. In this case, a carrier timestamp corresponding to third target yaw angle variation data is 20:53:35:020, Dec. 8, 2021, the third target yaw angle variation data also corresponds to the first target satellite positioning data and the second target satellite positioning data, a carrier timestamp corresponding to fourth target yaw angle variation data is 20:53:35:030, Dec. 8, 2021, and the fourth target yaw angle variation data also corresponds to the first target satellite positioning data and the second target satellite positioning data.

Operation 1044: Determine offset information between an $i^{th}$ target trajectory point and an $(i-1)^{th}$ target trajectory point based on the $j^{th}$ target satellite positioning data and the $(j+1)^{th}$ target satellite positioning data in the target satellite positioning sequence and the $i^{th}$ target yaw angle variation data in the target yaw angle variation sequence.

Figure 4C:
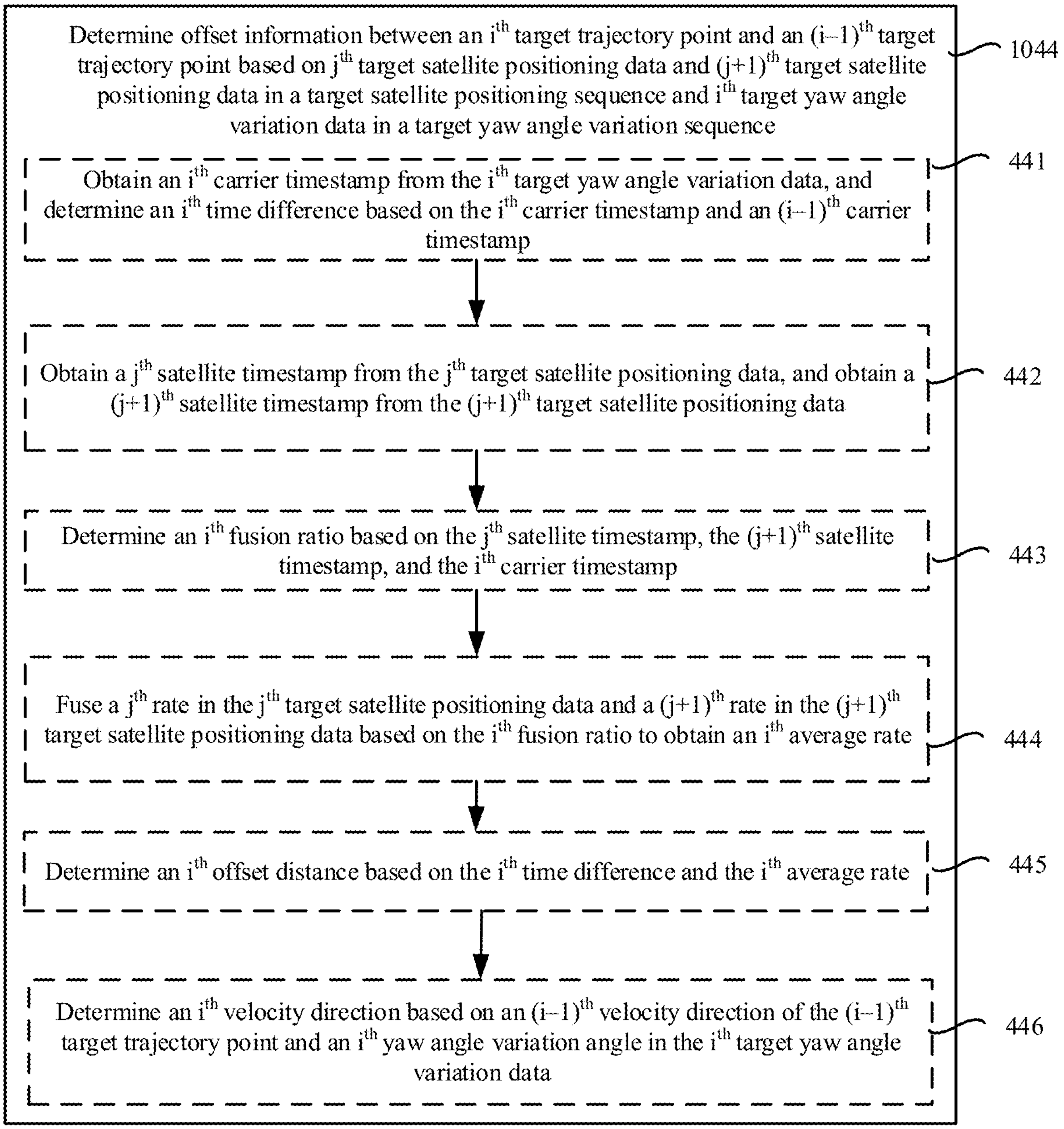
FIG. 4C is a schematic diagram of an implementation process of determining offset information between an $i^{th}$ target trajectory point and an $(i-1)^{th}$ target trajectory point according to some embodiments.

In some embodiments, operation 1044 shown in FIG. 4A may be implemented by operation 441 to operation 446 shown in FIG. 4C. The operations are described below with reference to FIG. 4C.

Operation 441: Obtain the $i^{th}$ carrier timestamp from the $i^{th}$ target yaw angle variation data, and determine an $i^{th}$ time difference based on the $i^{th}$ carrier timestamp and an $(i-1)^{th}$ carrier timestamp.

For example, the $i^{th}$ carrier timestamp is 20:53:35:010, Dec. 8, 2021, and the $(i-1)^{th}$ carrier timestamp is 20:53:35:000, Dec. 8, 2021. In this case, the $i^{th}$ time difference is 10 milliseconds.

Operation 442: Obtain the $j^{th}$ satellite timestamp from the $j^{th}$ target satellite positioning data, and obtain the $(j+1)^{th}$ satellite timestamp from the $(j+1)^{th}$ target satellite positioning data.

For example, a satellite timestamp corresponding to the $j^{th}$ target satellite positioning data is 20:53:35:005, Dec. 8, 2021, and a satellite timestamp corresponding to the $(j+1)^{th}$ target satellite positioning data is 20:53:35:055, Dec. 8, 2021.

Operation 443: Determine an $i^{th}$ fusion ratio based on the $j^{th}$ satellite timestamp, the $(j+1)^{th}$ satellite timestamp, and the $i^{th}$ carrier timestamp.

In some embodiments, the $i^{th}$ fusion ratio $R_i$ may be determined based on a formula (1-12):

$$R_i = \frac{Y[i].t - G[j].t}{G[j+1].t - G[j].t}, \tag{1-12}$$

where

G[j].t is the $j^{th}$ satellite timestamp, G[j+1].t is the $(j+1)^{th}$ satellite timestamp, and Y[i].t is the $i^{th}$ carrier timestamp.

With reference to the foregoing example, the $i^{th}$ carrier timestamp is 20:53:35:010, Dec. 8, 2021, the satellite timestamp corresponding to the $j^{th}$ target satellite positioning data is 20:53:35:005, Dec. 8, 2021, and the satellite timestamp corresponding to the $(j+1)^{th}$ target satellite positioning data is 20:53:35:055, Dec. 8, 2021. The $i^{th}$ fusion ratio determined based on the formula (1-12) is 0.1.

Operation 444: Fuse a $j^{th}$ rate in the $j^{th}$ target satellite positioning data and a $(j+1)^{th}$ rate in the $(j+1)^{th}$ target satellite positioning data based on the $i^{th}$ fusion ratio to obtain an $i^{th}$ average rate.

In some embodiments, the $i^{th}$ average rate $v_i$ may be determined based on a formula (1-13):

$$v_i = G[j].v.\text{value} + R_i * (G[j+1].v.\text{value} - G[j].v.\text{value}), \tag{1-13}$$

where

G[j].v.value is the $j^{th}$ rate in the $j^{th}$ target satellite positioning data, and G[j+1].v.value is the $(j+1)^{th}$ rate in the $(j+1)^{th}$ target satellite positioning data.

Operation 445: Determine an $i^{th}$ offset distance based on the $i^{th}$ time difference and the $i^{th}$ average rate.

In some embodiments, a product of the $i^{th}$ time difference and the $i^{th}$ average rate is the $i^{th}$ offset distance.

Operation 446: Determine an $i^{th}$ velocity direction based on an $(i-1)^{th}$ velocity direction of the $(i-1)^{th}$ target trajectory point and an $i^{th}$ yaw angle variation angle in the $i^{th}$ target yaw angle variation data.

In some embodiments, a sum of the $(i-1)^{th}$ velocity direction and the $i^{th}$ yaw angle variation angle is first determined, and whether the sum of the $(i-1)^{th}$ velocity direction and the $i^{th}$ yaw angle variation angle is between 0° and 360° is determined. If the sum is between 0° and 360°, the sum is determined as the $i^{th}$ velocity direction. If the sum is not between 0° and 360°, the sum of the $(i-1)^{th}$ velocity direction and the $i^{th}$ yaw angle variation angle is transformed to be between 0° and 360° to obtain the $i^{th}$ velocity direction. When the sum is less than 0°, 360° is added to the sum to obtain the $i^{th}$ velocity direction. When the sum is greater than 360°, 360° is subtracted from the sum to obtain the $i^{th}$ velocity direction.

For example, the $(i-1)^{th}$ velocity direction is 0°, and the $i^{th}$ yaw angle variation angle is 10°. In this case, the sum of the $(i-1)^{th}$ velocity direction and the $i^{th}$ yaw angle variation angle is 10°. Because 10° is between 0° and 360°, it is determined that the $i^{th}$ velocity direction is 10°. Assuming that the $(i-1)^{th}$ velocity direction is 0° and the $i^{th}$ yaw angle variation angle is −10°, the sum of the $(i-1)^{th}$ velocity direction and the $i^{th}$ yaw angle variation angle is −10°. Because −10° is not between 0° and 360°, 360° is added to −10° to obtain 350°, and it is determined that the $i^{th}$ velocity direction is 350°.

During the determining of the offset information between the $(i-1)^{th}$ target trajectory point and the $i^{th}$ target trajectory point in operation 441 to operation 446, a time difference between the $(i-1)^{th}$ target trajectory point and the $i^{th}$ target trajectory point is first determined. The $i^{th}$ fusion ratio is determined based on the $j^{th}$ satellite timestamp, the $(j+1)^{th}$ satellite timestamp, and the $i^{th}$ carrier timestamp, and rates are fused based on the $i^{th}$ fusion ratio to obtain an average rate. An offset distance is determined based on a distance formula. During determining of a velocity direction, the $i^{th}$ velocity direction is determined based on the $(i-1)^{th}$ velocity direction and the $i^{th}$ yaw angle variation angle, to update a moving direction of the carrier based on a yaw angle variation angle when a yaw angle of the carrier changes.

Still refer to FIG. 4A. Operations after operation 1044 are described.

Operation 1045: Determine $i^{th}$ target trajectory point data based on $(i-1)^{th}$ target trajectory point data and the offset information.

Figure 5A:
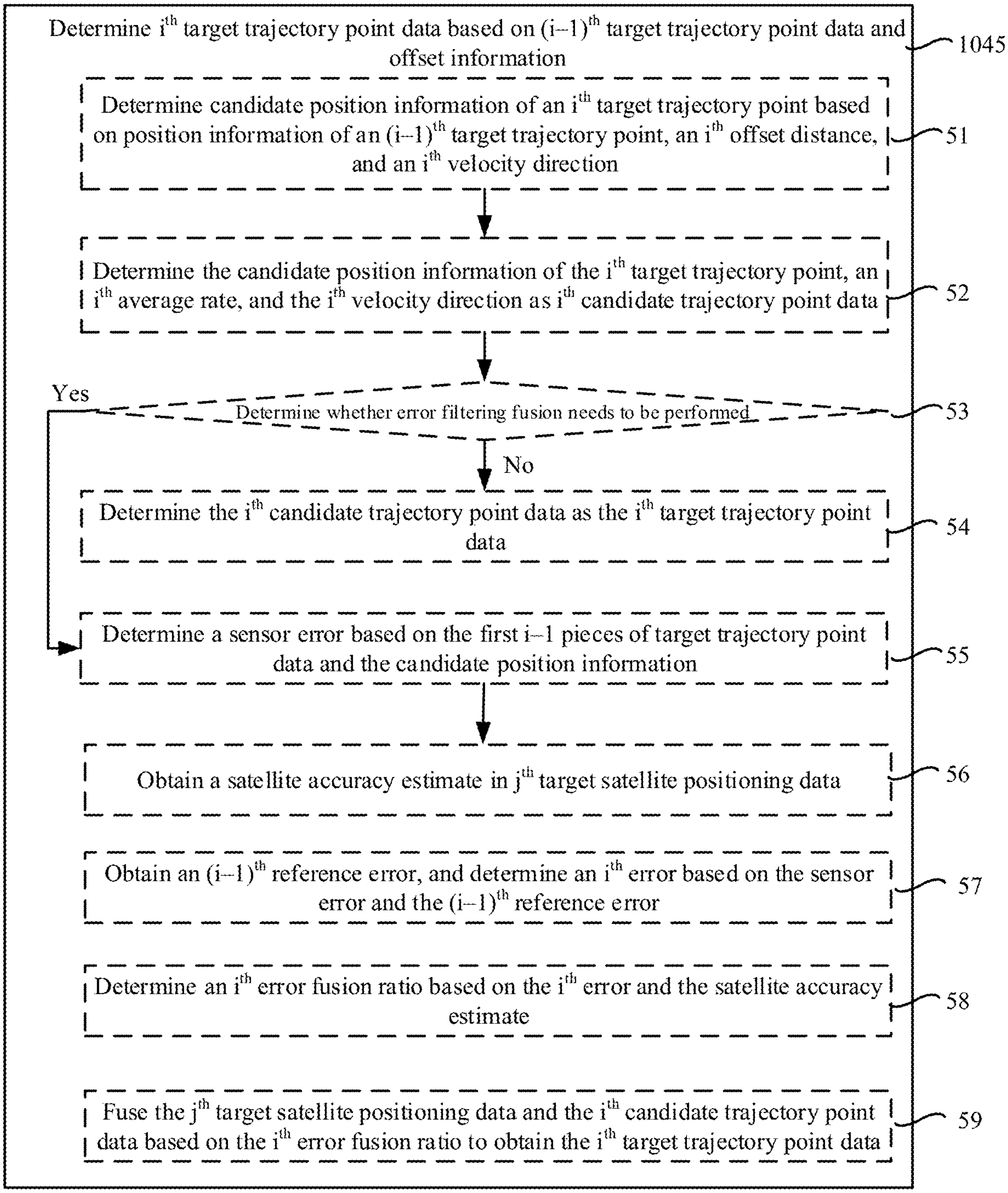
FIG. 5A is a schematic diagram of an implementation process of determining $i^{th}$ target trajectory point data according to some embodiments.

In some embodiments, operation 1045 shown in FIG. 4A may be implemented by operation 51 to operation 59 shown in FIG. 5A. The operations are described below with reference to FIG. 5A.

Operation 51: Determine candidate position information of the $i^{th}$ target trajectory point based on position information of the $(i-1)^{th}$ target trajectory point, the $i^{th}$ offset distance, and the $i^{th}$ velocity direction.

The position information of the $(i-1)^{th}$ target trajectory point includes a longitude and a latitude of the $(i-1)^{th}$ target trajectory point. The candidate position information of the $i^{th}$ target trajectory point includes a candidate longitude and a candidate latitude of the $i^{th}$ target trajectory point. In some embodiments, a circumference of a cross section at a current latitude is first determined by using the latitude of the $(i-1)^{th}$ target trajectory point. A horizontal translation distance between the $(i-1)^{th}$ target trajectory point and the $i^{th}$ target trajectory point is determined based on the $i^{th}$ offset distance and the $i^{th}$ velocity direction. The horizontal translation distance is divided by the circumference of the cross section at the current latitude and by 360 to obtain horizontal lateral translation degrees. The horizontal lateral translation degrees are added to the longitude of the $(i-1)^{th}$ target trajectory point to obtain the candidate longitude of the $i^{th}$ target trajectory point.

A vertical translation distance between the $(i-1)^{th}$ target trajectory point and the $i^{th}$ target trajectory point is determined based on the $i^{th}$ offset distance and the $i^{th}$ velocity direction. The vertical translation distance is divided by a longitudinal circumference of the Earth and by 360 to obtain vertical longitudinal translation degrees. The vertical longitudinal translation degrees are added to the latitude of the $(i-1)^{th}$ target trajectory point to obtain the candidate latitude of the $i^{th}$ target trajectory point.

Operation 52: Determine the candidate position information of the $i^{th}$ target trajectory point, the $i^{th}$ average rate, and the $i^{th}$ velocity direction as $i^{th}$ candidate trajectory point data.

Operation 53: Determine whether error filtering fusion is to be performed.

When it is determined that no error filtering fusion is to be performed, operation 54 is performed. When it is determined that error filtering fusion is to be performed, operation 55 is performed.

Operation 54: Determine the $i^{th}$ candidate trajectory point data as the $i^{th}$ target trajectory point data.

If no error filtering fusion is to be performed, the $i^{th}$ candidate trajectory point data is determined as the $i^{th}$ target trajectory point data.

Operation 55: Determine a sensor error based on the first $i-1$ pieces of target trajectory point data and the candidate position information.

In some embodiments, the sensor error may be determined by using a preset error estimation function with the calculated first $i-1$ pieces of target trajectory point data and candidate position information as inputs.

Operation 56: Obtain a satellite accuracy estimate in the $j^{th}$ target satellite positioning data.

In some embodiments, the satellite accuracy estimate in the $j^{th}$ target satellite positioning data may be obtained by performing, by using a trained accuracy estimation model, accuracy estimation on a quantity of satellites, satellite mass, a historical trajectory, and other information.

Operation 57: Obtain an $(i-1)^{th}$ reference error, and determine an $i^{th}$ error based on the sensor error and the $(i-1)^{th}$ reference error.

In some embodiments, the $(i-1)^{th}$ reference error is determined based on an $(i-1)^{th}$ error and an $(i-1)^{th}$ error fusion ratio. In some embodiments, the $(i-1)^{th}$ reference error is determined based on a formula (1-14):

$$Err'_{i-1} = Err_{i-1} * (1 - K_{i-1}), \tag{1-14}$$

$Err'_{i-1}$ is the $(i-1)^{th}$ reference error, $Err_{i-1}$ is the $(i-1)^{th}$ error, and $K_{i-1}$ is the $(i-1)^{th}$ error fusion ratio.

The $i^{th}$ error is a sum of the sensor error and the $(i-1)^{th}$ reference error.

Operation 58: Determine an $i^{th}$ error fusion ratio based on the $i^{th}$ error and the satellite accuracy estimate.

In some embodiments, an error sum of the $i^{th}$ error and the satellite accuracy estimate is further determined, and a quotient of the satellite accuracy estimate and the error sum is determined as the $i^{th}$ error fusion ratio.

Operation 59: Fuse the $j^{th}$ target satellite positioning data and the ii candidate trajectory point data based on the $i^{th}$ error fusion ratio to obtain the $i^{th}$ target trajectory point data.

In some embodiments, first, $j^{th}$ position information, $j^{th}$ direction information, and the $j^{th}$ rate in the $j^{th}$ target satellite positioning data are obtained, and the candidate position information, the $i^{th}$ velocity direction, and the $i^{th}$ average rate in the $i^{th}$ candidate trajectory point data are obtained. A position difference between the candidate position information and the $j^{th}$ position information is determined, a direction difference between the $i^{th}$ velocity direction and a $j^{th}$ direction is determined, and a rate difference between the $i^{th}$ average rate and the $j^{th}$ rate is determined.

A sum of the $j^{th}$ position information and a product of the position difference and the $i^{th}$ error fusion ratio is determined as target position information of the $i^{th}$ target trajectory point, a sum of the $j^{th}$ direction information and a product of the direction difference and the $i^{th}$ error fusion ratio is determined as target direction information of the $i^{th}$ target trajectory point, and a sum of the $j^{th}$ rate and a product of the rate difference and the $i^{th}$ error fusion ratio is determined as a target rate of the $i^{th}$ target trajectory point.

In operation 451 to operation 459, candidate trajectory point data of the $i^{th}$ target trajectory point is first determined. If no error filtering fusion is to be performed, the candidate trajectory point data is determined as final trajectory point data of the $i^{th}$ target trajectory point. If error filtering fusion is to be performed, the sensor error is to be first estimated, an error fusion ratio is determined based on the sensor error and an accuracy estimate in satellite positioning data, and the $j^{th}$ target satellite positioning data and the $i^{th}$ candidate trajectory point data are fused based on the $i^{th}$ error fusion ratio to obtain the $i^{th}$ target trajectory point data. More smooth, stable, and accurate target trajectory point data may be obtained through error filtering fusion.

In the data processing method provided in some embodiments, after satellite positioning information of a terminal is obtained, a sensor data set captured by a target sensor in the terminal is obtained, the sensor data set including at least an acceleration sensor data set and a gyroscope data set. Yaw angle variation information of a carrier in which the terminal is located during movement is determined based on the acceleration sensor data set and the gyroscope data set. The satellite positioning information and the yaw angle variation information are fused to obtain moving trajectory information of the carrier. In some embodiments, the sensor data set of the terminal is incorporated into an observation dimension, and the yaw angle variation information determined by using the sensor data set is fused with the satellite positioning information. Actual trajectory information of the carrier carrying the terminal may be more accurately determined by using the yaw angle variation information in a case that the satellite positioning information is missing or satellite positioning quality is poor. This improves accuracy of a moving trajectory.

Figure 5B:
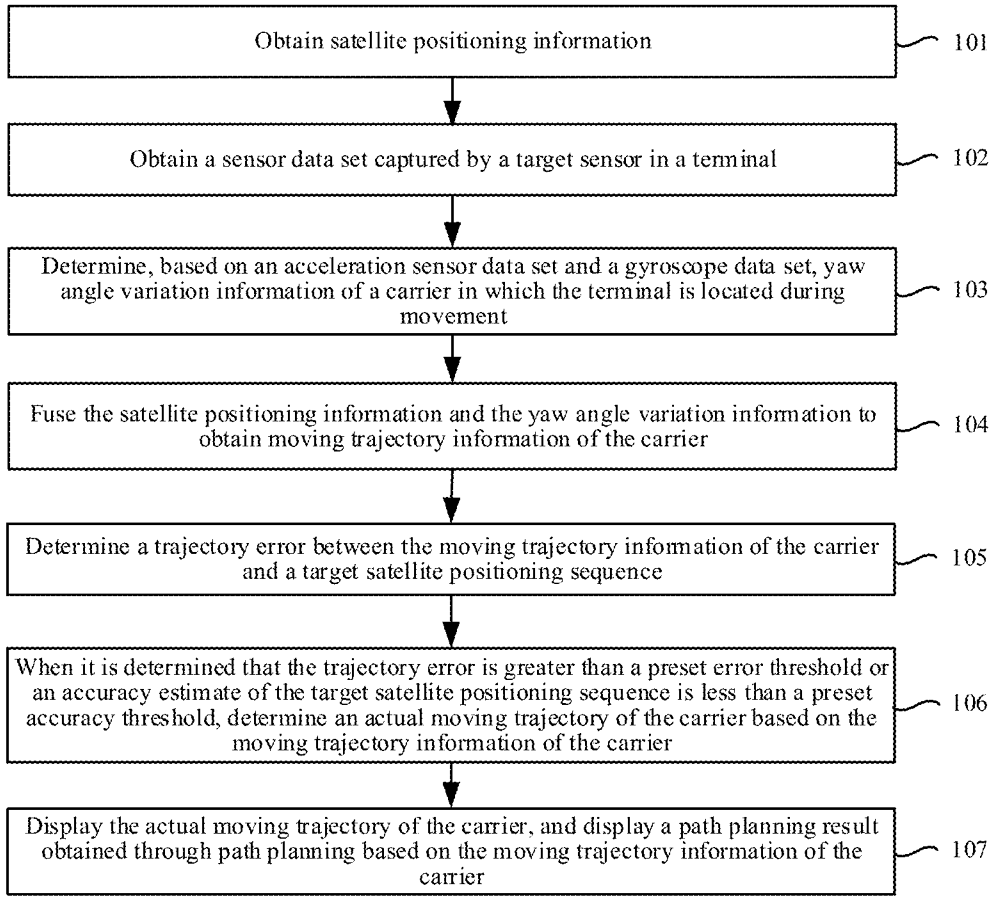
FIG. 5B is another schematic implementation flowchart of a data processing method according to some embodiments.

In some embodiments, as shown in FIG. 5B, the following operation 105 and operation 106 may be further performed after operation 104. The operations are described below.

Operation 105: Determine a trajectory error between the moving trajectory information of the carrier and the target satellite positioning sequence.

In some embodiments, target trajectory point data within preset duration may be obtained from the moving trajectory information of the carrier each time, and target satellite positioning data within the preset duration is obtained from the target satellite positioning sequence. For example, target trajectory point data and target satellite positioning data within 1 second are obtained each time. Position information in each piece of target trajectory point data and position information in each piece of target satellite positioning data are determined, a distance between each target trajectory point and each target satellite anchor point is determined, and a shortest distance among all distances is determined as a trajectory error within the preset duration.

Operation 106: When it is determined that the trajectory error is greater than a preset error threshold or an accuracy estimate of the target satellite positioning sequence is less than a preset accuracy threshold, determine an actual moving trajectory of the carrier based on the moving trajectory information of the carrier.

The moving trajectory information of the carrier is obtained by combining absolute positioning accuracy of the GNSS and local relative positioning accuracy of the sensor, and therefore has higher accuracy. When the trajectory error is greater than the preset error threshold, satellite positioning data has a large deviation from a moving trajectory of the carrier; or when the accuracy estimate of the target satellite positioning sequence is less than the preset accuracy threshold, current target satellite positioning data has low credibility. In this case, the actual moving trajectory of the carrier may be determined based on the moving trajectory information of the carrier. The actual moving trajectory of the carrier may be obtained by sequentially connecting adjacent target trajectory points in the moving trajectory information.

Operation 107: Display the actual moving trajectory of the carrier, and display a path planning result obtained through path planning based on the moving trajectory information of the carrier.

In some embodiments, the actual moving trajectory of the carrier may be displayed in a preset color on a display interface of the terminal. In some embodiments, the terminal may transmit the moving trajectory information of the carrier to a server. The server performs path planning based on the moving trajectory information of the carrier. The server obtains current position information of the carrier from the moving trajectory information of the carrier, obtains preset destination information, and performs path planning based on the current position information of the carrier and the destination information to obtain a path planning result. The server transmits the path planning result to the terminal. The terminal displays the path planning result. During the path planning, the server uses the moving trajectory information that is obtained by fusing the satellite positioning information and the yaw angle variation information. The moving trajectory information may combine absolute positioning accuracy of the GNSS and local relative positioning accuracy of the sensor, and therefore may have higher accuracy.

The following describes an application scenario.

The data processing method provided in some embodiments may be applied to mobile phone navigation and vehicle navigation (a vehicle system without integrating vehicle wheel speed information) to avoid negative impact, such as false yawing, freezing, and unsmoothness, caused by insufficient GNSS positioning accuracy in some complex scenarios (under an elevated highway, at an intersection or a fork, or at a low speed), to improve product effect.

As a quantity of cars continuously increases, map navigation is increasingly widely applied. In the field of map navigation, accurate positioning plays a role in navigation route planning, yaw judgment, road condition analysis, and other applications. Accurate positioning can bring a user more comfortable experience and give accurate and appropriate driving guidance to accurately and quickly guide the user to a destination while avoiding violations and ensuring driving safety. This improves traveling safety of cars, reduces a traffic accident rate, improves traffic safety, and alleviates traffic congestion.

Figure 6:
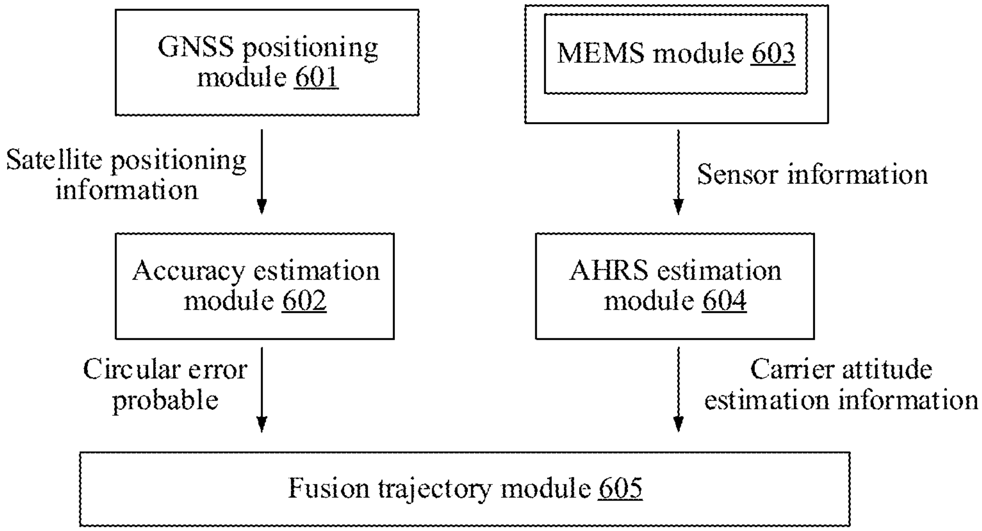
FIG. 6 is a schematic structural diagram of composition of a data processing system according to some embodiments.

Some embodiments provide a data processing system. FIG. 6 is a schematic structural diagram of composition of a data processing system according to some embodiments. As shown in FIG. 6, the data processing system includes a GNSS positioning module 601, an accuracy estimation module 602, a MEMS module 603, an attitude and heading reference system (AHRS) estimation module 604, and a fusion trajectory module 605. The following describes the modules separately.

The GNSS positioning module 601 is configured to obtain GNSS positioning information (which may be based on ordinary GNSS positioning, precise point positioning (PPP), real-time kinematic (RTK) positioning, or the like) of a navigation system to obtain anchor point information at a current moment. The anchor point information includes position information P (including latitude and longitude coordinates), time T at which a current anchor point is obtained, and a velocity V (including a velocity value and direction).

The accuracy estimation module 602 is configured to perform accuracy measurement. Accuracy measurement is a process of calculating a difference between a position obtained through positioning and a real position. The real position exists in the real world, and the position obtained through positioning is obtained by using a positioning method or a positioning system. However, it may be difficult or even impossible to obtain the real position. Effective and accurate accuracy estimation may provide reference for an algorithm module or a use policy in practice.

Accuracy estimation may be performed in many manners. For example, accuracy estimation is performed by using a trained accuracy estimation model based on GNSS satellite mass, historical trajectory information, and other data used in GNSS positioning to obtain an accuracy estimate. The accuracy estimate may be expressed in the form of a CEP such as CEP95 or CEP99. For example, CEP95=E means that, a probability that a real position falls within a circle with an output position as a center and with a radius of E is 95%.

The MEMS module 603 is configured to capture a reading of a MEMS sensor in a terminal. In some embodiments, a three-axis acceleration sensor result, a three-axis gyroscope result, and a three-axis magnetic sensor result in the MEMS sensor are captured.

The AHRS estimation module is configured to estimate an initial attitude of a mobile phone/in-vehicle device based on output data of a mobile phone/in-vehicle device sensor. The AHRS includes a three-axis accelerometer, a three-axis magnetometer, and a three-axis gyroscope. The AHRS estimation module estimates an initial attitude based on output data of the three-axis accelerometer, the three-axis magnetometer, and the three-axis gyroscope. The AHRS can provide yaw angle, roll angle, and pitch angle information for a device.

Figure 7:
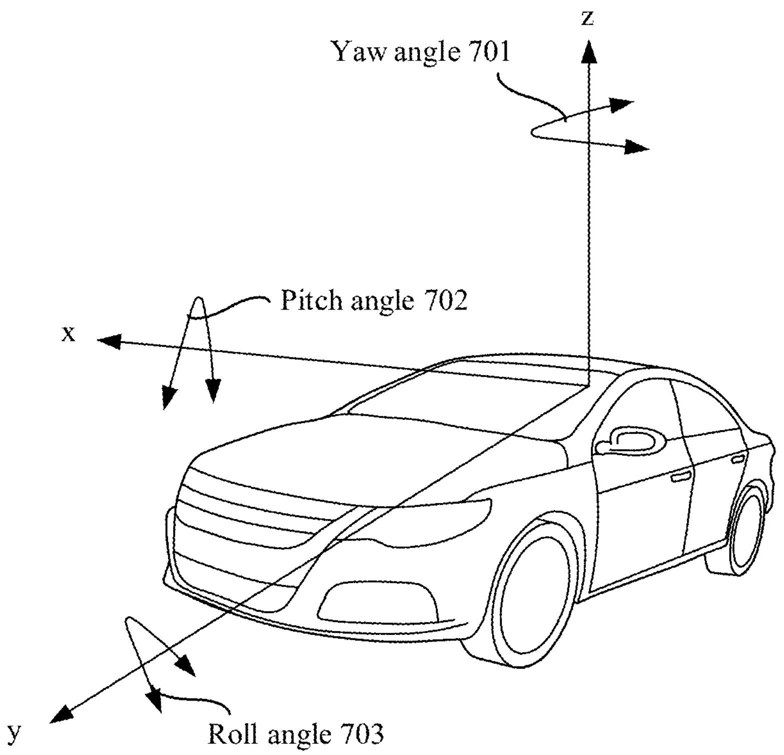
FIG. 7 is a schematic diagram of a vehicle attitude angle according to some embodiments.

As shown in FIG. 7, a three-dimensional coordinate system O-xyz may be obtained with a center of a vehicle as an origin, a left side of the vehicle as an X-axis, a heading direction as a Y-axis, and an upward direction perpendicular to a vertical plane as a Z-axis (a definition of the coordinate system is not limited, and an X-axis may be in the heading direction, a Y-axis may be on a left side, and a Z-axis may be in the upward direction). In some embodiments, a rotation angle around the Z-axis is defined as a yaw angle 701, representing a variation of a heading angle of the vehicle (which indicates that the vehicle turns left or right); a rotation angle around the X-axis is defined as a pitch angle 702, representing a variation of a pitch angle of the vehicle (which indicates an upslope/downslope state of the vehicle); and a rotation angle around the Y-axis is defined as a roll angle 703, representing a lateral tilt state of the vehicle. The yaw angle, the roll angle, and the pitch angle of the vehicle may be decomposed to an X-Y plane, an X-Z plane, and a Y-Z plane respectively for expression.

During driving, a mobile phone/in-vehicle device may be placed in a stationary state relative to a vehicle at a fixed attitude, and a fixed angle exists between a three-dimensional coordinate system of the vehicle and a three-dimensional coordinate system of the mobile phone. Therefore, the mobile phone/in-vehicle device has an initial placement attitude relative to the vehicle coordinate system. Assuming that initial values of a yaw angle, a roll angle, and a pitch angle are $z_0$, $y_0$, and $x_0$, the three initial values may be estimated by using an AHRS estimation algorithm. In some embodiments, the AHRS algorithm is not limited, and may be, for example, a complementary filtering algorithm, a gradient descent algorithm, or an extended Kalman filter (EKF) attitude fusion algorithm.

Figure 8:
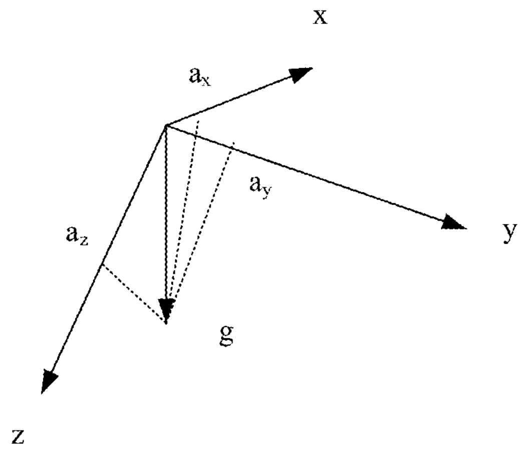
FIG. 8 is a schematic diagram of reading of an accelerometer according to some embodiments.

As shown in FIG. 8, a vector sum obtained based on a three-axis acceleration sensor in the stationary state is a gravity acceleration g. Based on this relationship, the following equation may be obtained:

$$\begin{bmatrix} a_x \\ a_y \\ a_z \end{bmatrix} = C_v^{cT} * \begin{bmatrix} 0 \\ 0 \\ |g| \end{bmatrix}, \tag{2-1}$$

$a_x$, $a_y$, and $a_z$ are accelerometer readings of an X-axis, a Y-axis, and a Z-axis, $$C_v^c$$

indicates a conversion matrix between the vehicle coordinate system and the mobile phone/in-vehicle device coordinate system, and $$C_v^c$$

may be obtained based on the following formula (2-2):

$$\begin{aligned} C_v^c &= R_z * R_y * R_x \\ &= \begin{bmatrix} \cos(z_0) & -\sin(z_0) & 0 \\ \sin(z_0) & \cos(z_0) & 0 \\ 0 & 0 & 1 \end{bmatrix} * \begin{bmatrix} \cos(y_0) & 0 & \sin(y_0) \\ 0 & 1 & 0 \\ -\sin(y_0) & 0 & \cos(y_0) \end{bmatrix} * \\ &\quad \begin{bmatrix} 1 & 0 & 0 \\ 0 & \cos(x_0) & -\sin(x_0) \\ 0 & \sin(x_0) & \cos(x_0) \end{bmatrix}, \end{aligned} \tag{2-2}$$

where g is a local gravity acceleration, may be approximately 9.8 $m/s^2$, varies at different latitudes, and meets a formula (2-3):

$$|g| = \sqrt[2]{a_x^2 + a_y^2 + z_z^2}. \tag{2-3}$$

The following may be calculated based on the formulas (2-1), (2-2), and (2-3):

$$\begin{bmatrix} a_x \\ a_y \\ a_z \end{bmatrix} = \begin{bmatrix} -g * \cos(x_0) * \sin(y_0) \\ g \sin(x_0) \\ g * \cos(x_0) * \cos(y_0) \end{bmatrix}. \tag{1-1}$$

Based on the formula (1-1), the initial value $x_0$ of the pitch angle is as follows:

$$x_0 = \arcsin \frac{a_y}{\sqrt[2]{a_x^2 + a_y^2 + a_z^2}}; \tag{1-2}$$

the initial value $y_0$ of the roll angle is as follows:

$$y_0 = \arctan \frac{-a_x}{a_z}. \tag{1-3}$$

In some embodiments, the yaw angle variation information, for example, a difference between heading angles at two adjacent moments, of the carrier is to be calculated. Therefore, regardless of a value of an initial yaw angle, the obtained yaw angle variation information is consistent. Therefore, a preset initial yaw angle of the terminal relative to the carrier may be directly obtained. In some embodiments, $z_0$ may be determined based on a reading of the three-axis magnetometer, a heading angle of the vehicle, and the calculated $x_0$ and $y_0$.

After the initial value $z_0$ of the yaw angle, the initial value $y_0$ of the roll angle, and the initial value $x_0$ of the pitch angle are determined, the conversion matrix $$C_v^c$$

may be obtained based on the formula (2-2). Therefore, after a reading of the three-axis gyroscope of the mobile phone/in-vehicle device is obtained, three-axis gyroscope rotation angles of the vehicle may be obtained based on a formula (2-4):

$$\begin{bmatrix} gyr'_x \\ gyr'_y \\ gyr'_z \end{bmatrix} = C_v^{cT-1} * \begin{bmatrix} gyr_x \\ gyr_y \\ gyr_z \end{bmatrix}, \tag{2-4}$$

$gyr_x'$, $gyr_y'$, and $gyr_z'$ represent three-axis gyroscope rotation angles in the vehicle coordinate system. Some embodiments provide $gyr_z'$, for example, a yaw angle of the vehicle. Based on this, yaw angle variation information of the vehicle can be finally obtained. The yaw angle variation information is 2-tuple information:

$$(t, \Delta\theta_t^{yaw}),$$

where t corresponds to a current timestamp, $$\Delta\theta_t^{yaw}$$

represents a yaw angle variation corresponding to the current timestamp t, for example, a yaw angle difference of $gyr_z'$ at the moment t and a moment t−1.

The fusion trajectory module 605 is configured to obtain a new vehicle positioning trajectory based on a GNSS positioning result and the yaw angle variation information of the vehicle.

It is assumed that the GNSS positioning information is expressed as a four-tuple sequence G(t, p, v, e). t represents a timestamp of a signal. p represents anchor point information of the signal, and the anchor point information includes p.lon and p.lat that represent a longitude and a latitude of the anchor point respectively. v represents velocity information of the vehicle, including v.value and v.heading that represent a velocity value and a velocity direction respectively (a definition of the direction is not limited, and herein, it may be assumed that the direction is expressed as a value within [0, 360) that is 0 in the true north and that is positive in a clockwise direction). e represents an accuracy estimate determined by the accuracy estimation module. The yaw angle variation information of the vehicle is expressed as a two-tuple sequence Y (t, deltaYaw), where t represents a timestamp of a signal, and deltaYaw represents a yaw angle variation of the vehicle at a moment t. In some embodiments, each piece of four-tuple data in the G sequence corresponds to a G sequence index, and each piece of two-tuple data in the Y sequence corresponds to a Y sequence index.

In some embodiments, to reduce calculation overheads, calculation may not be performed for an entire positioning trajectory. In this case, start time and end time of positioning trajectory calculation is to be obtained, and are denoted as startTime and endTime. If an entire positioning trajectory is to be calculated, startTime is defined as a timestamp of the first signal, and endTime is defined as a latest timestamp of a current moment.

During calculation of a positioning trajectory of the vehicle, an index whose timestamp has a smallest difference from startTime is first determined from the Y sequence. An index with smallest ABS(Y.t-startTime) may be determined and may be denoted as startYIndex. ABS( ) indicates to calculate an absolute value. An index whose timestamp has a smallest difference from endTime is determined from the Y sequence. An index with smallest ABS(Y.t-endTime) may be determined and may be denoted as endYIndex. An index whose timestamp is earlier than and closest to Y[firstYIndex].t, for example, an index with smallest ABS(G.t-Y[firstYIndex].t) under the condition of G.t<Y[firstYIndex].t, is determined from the G sequence, and is denoted as startGIndex. Trajectory calculation from startYIndex to endYIndex is performed. In some embodiments, a signal frequency of Y cannot be lower than a frequency of G.

The following describes an implementation process of the trajectory calculation from startYIndex to endYIndex.

Operation 1: Determine an initial reference point.

In some embodiments, G[startGIndex] and G[startGIndex+1] are first obtained from the G sequence, Y[startYIndex] is obtained from the Y sequence, and a first fusion ratio is determined based on timestamps in G[startGIndex], G[startGIndex+1], and Y[startYIndex]. In some embodiments, the first fusion ratio may be obtained based on a formula (2-5):

$$R_1 = \frac{Y[startYIndex].t - G[startGIndex].t}{G[startGIndex+1].t - G[startGIndex].t}. \tag{2-5}$$

Position information in G[startGIndex] and position information in G[startGIndex+1] are fused based on the first fusion ratio to obtain position information of the initial reference point, and a velocity value in G[startGIndex] and a velocity value in G[startGIndex+1] are fused based on the first fusion ratio to obtain a velocity value of the initial reference point. Fusion of longitudes in position information is described below as an example. The longitudes in the position information may be fused based on a formula (2-6):

$$NewPos_1.p.lon = (1-R_1) * G[startGIndex].p.lon + R_1 * G[startGIndex+1].p.lon, \tag{2-6}$$

where $NewPos_1$.p.lon is a longitude of the initial reference point, G[startGIndex].p.lon is a longitude in position information of G[startGIndex], and G[startGIndex+1].p.lon is a longitude in position information of G[startGIndex+1].

When latitudes or velocity values in the position information are fused based on the first fusion ratio, only the longitudes in the formula (2-6) may be updated to the latitudes and the velocity values.

During determining of a velocity direction of the initial reference point, an initial direction difference between G[startGIndex] and G[startGIndex+1] is first determined, the initial direction difference is multiplied by the first fusion ratio to obtain a target direction difference, and finally, the velocity direction of the initial reference point is determined based on a velocity direction in G[startGIndex] and the target direction difference.

The velocity direction in G[startGIndex] is an angle defined in a direction system and falls within a value range of [0, 360). The initial directional difference between G[startGIndex] and G[startGIndex+1] is an angle of rotation from the velocity direction in G[startGIndex] to a velocity direction in G[startGIndex+1], where a value in a clockwise direction is positive, a value in a counterclockwise direction is negative, and a value range is [−180, 180].

For example, the velocity direction in G[startGIndex] is 340°, and the velocity direction in G[startGIndex+1] is 350°.

Because an angle of rotation from the velocity direction in G[startGIndex] to the velocity direction in G[startGIndex+1] is 100 clockwise, the initial direction difference between G[startGIndex] and G[startGIndex+1] is 10°. For another example, the velocity direction in G[startGIndex] is 100°, and the velocity direction in G[startGIndex+1] is 90°. Because an angle of rotation from the velocity direction in G[startGIndex] to the velocity direction in G[startGIndex+1] is 100 counterclockwise, the initial direction difference between G[startGIndex] and G[startGIndex+1] is −10°.

The determining the velocity direction of the initial reference point based on the velocity direction in G[startGIndex] and the target direction difference is implemented as follows: A sum of the velocity direction in G[startGIndex] and the target direction difference is first determined. If the sum is within the range of [0, 360), the sum is determined as the velocity direction of the initial reference point. If the sum is beyond the range of [0, 360) and the sum is less than 0, 360 is added to the sum to obtain the velocity direction of the initial reference point. If the sum is beyond the range of [0, 360) and the sum is greater than or equal to 360, 360 is subtracted from the sum to obtain the velocity direction of the initial reference point.

Operation 2: Determine a fusion anchor point between startYIndex+1 and endIndex.

During the determining of the fusion anchor point between startYIndex+1 and endIndex, offset information between a fusion anchor point to be determined this time and a previous determined fusion anchor point may be determined, and position information of the fusion anchor point to be determined this time is determined based on the previous fusion anchor point and the offset information.

In some embodiments, Y-sequence data in Y[startYIndex+1] to Y[endYIndex] is sequentially determined as current to-be-processed data (curYsignal), and a start position and an end position corresponding to each curYsignal are determined from the G sequence, where the following conditions are met: posStart.t<=curYsignal.t, and posEnd.t>curYsignal.t. A fusion ratio for each curYsignal is determined based on timestamps of each curYsignal and the start position and the end position corresponding to each curYsignal. In some embodiments, the fusion ratio for curYsignal may be obtained based on a formula (2-7):

$$R_{cur} = \frac{curYSignal.t - posStart.t}{posEnd.t - posStart.t}, \tag{2-7}$$

curYSignal.t is a timestamp of curYsignal, posStart.t is a timestamp of the start position corresponding to curYsignal, and posEnd.t is a timestamp of the end position corresponding to curYsignal.

Based on the fusion ratio for curYsignal, velocity values of the start position and the end position corresponding to curYsignal are fused based on a formula (2-8) to obtain a velocity value curSpd of curYsignal:

$$curSpd = posStart.v.value + R_{cur} * (posEnd.v.value - posStart.v.value), \tag{2-8}$$

where posStart.v.value is the velocity value of the start position corresponding to curYsignal, and posEnd.v.value is the velocity value of the end position corresponding to curYsignal.

A time difference between curYsignal and a previous fusion anchor point of curYsignal is determined, and the velocity value of curYsignal is multiplied by the time difference to obtain an offset distance.

In some embodiments, a velocity direction of curYsignal is determined based on a sum of a velocity direction of the previous fusion anchor point and a yaw angle variation angle of the vehicle in curYsignal.

If a longitude and a latitude of the previous fusion anchor point and the offset distance and an offset direction between the current to-be-processed curYsignal and the previous fusion anchor point are known, a longitude and a latitude of curYsignal can be determined. After the velocity value, the velocity direction, the longitude, and the latitude of curYsignal are determined, position information of a fusion anchor point corresponding to curYsignal is obtained.

Operation 3: If it is determined that filtering fusion is to be performed, filtering fusion is performed on the fusion anchor point corresponding to curYsignal and the start position corresponding to curYsignal to obtain a final trajectory anchor point.

In some embodiments, a sensor error (E_Sensor) of the fusion anchor point corresponding to curYsignal may be estimated based on a determined historical fusion anchor point and the fusion anchor point corresponding to curYsignal, an accuracy estimate (E_GSignal) of the start position corresponding to curYsignal and a previous reference error (Err_last) are obtained, a sum of the previous reference error and the sensor error is determined as a current error (Err_now), and a filtering fusion ratio $R_k$ is determined based on a formula (2-9):

$$R_k = \frac{\text{E\_Gsignal}}{\text{E\_Gsignal} + \text{Err\_now}}. \tag{2-9}$$

The start position corresponding to curYsignal and the longitude, the latitude, and the velocity value, determined in operation 2, of the fusion anchor point corresponding to curYsignal are fused based on the filtering fusion ratio. Fusion with the longitude based on the filtering fusion ratio is described below as an example. In some embodiments, the start position corresponding to curYsignal and the longitude of the fusion anchor point corresponding to curYsignal may be fused based on a formula (2-10):

$$FusionPoint.p.lon = posStart.p.lon + R_k * (NewPos.p.lon - posStart.p.lon), \tag{2-10}$$

where

FusionPoint.p.lon is a longitude of a trajectory anchor point obtained through filtering fusion, and NewPos.p.lon is the longitude, determined in operation 2, of the fusion anchor point corresponding to curYsignal.

When the start position corresponding to curYsignal and the latitude or the velocity value, determined in operation 2, of the fusion anchor point corresponding to curYsignal are fused based on the filtering fusion ratio, only the longitude in the formula (2-10) may be updated to the latitude or the velocity value.

After position information of the trajectory anchor point obtained through filtering fusion is determined, the previous reference error is updated based on a formula (2-11):

$$\text{Err\_last} = (1 - R_k) * \text{Err\_now}. \tag{2-11}$$

Figure 9:
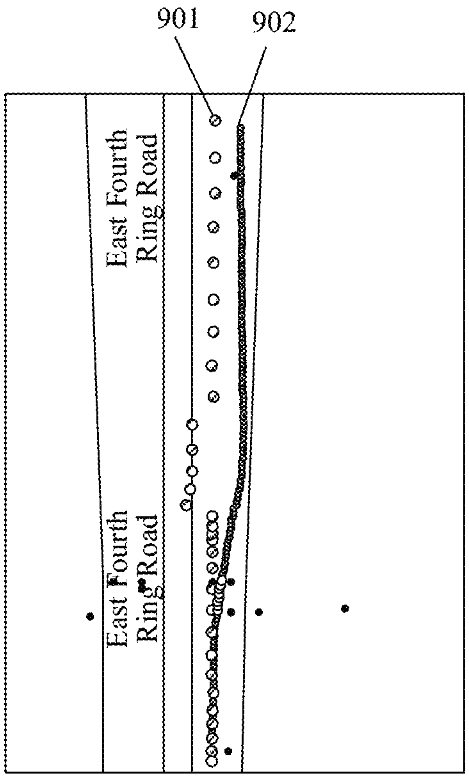
FIG. 9 is a schematic diagram of a scenario in which a data processing method provided in some embodiments is applied under an elevated highway.

Based on the foregoing three operations, a calculated trajectory based on satellite positioning coordinates and sensor signals can be finally obtained. FIG. 9 is a schematic diagram of a scenario in which a data processing method provided in some embodiments is applied under an elevated highway. In FIG. 9, a larger dot 901 is an original GNSS signal anchor point with a frequency of 1 Hz, and a smaller dot 902 is a new trajectory signal with a frequency of 10 Hz that is obtained through fusion based on a GNSS signal and a mobile phone sensor. It can be learned from FIG. 9 that, because satellite signals are blocked under the elevated highway, accuracy of an anchor point obtained depending only on a satellite system is significantly reduced, and a left-right drift may occur. After sensor signals are fused, it can be learned that trajectory points become continuous and stable, and it can even be learned that a vehicle changes a lane to the right under the elevated highway.

Figure 10:
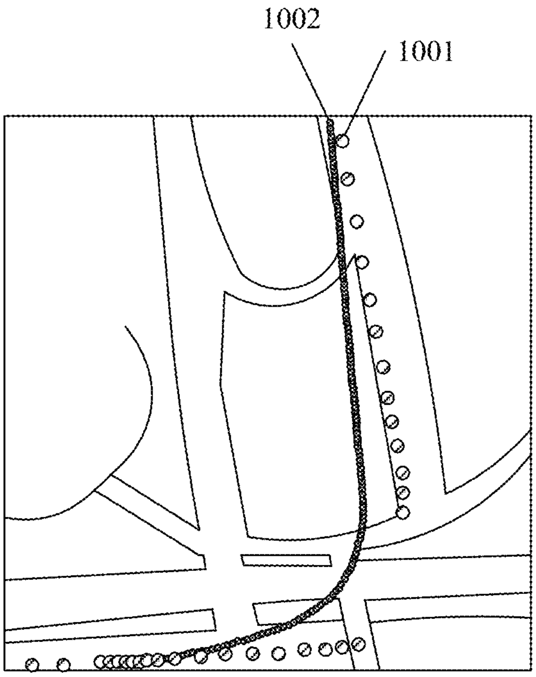
FIG. 10 is a schematic diagram of a scenario in which a data processing method provided in some embodiments is applied at an intersection.

FIG. 10 is a schematic diagram of a scenario in which a data processing method provided in some embodiments is applied at an intersection. A larger dot 1001 is an original GNSS signal anchor point with a frequency of 1 Hz, and a smaller dot 1002 is a new trajectory signal obtained through fusion based on a GNSS signal and a mobile phone sensor. In some intelligent terminals, a GNSS anchor point may have some road binding effects, leading to freezing and jumping between adjacent GPS points during turning at the intersection. After sensor data is fused, it can be learned from FIG. 10 that a more complete and smoother turning trajectory can be obtained.

Some embodiments provide a data processing method, to fuse a GNSS anchor point and a device sensor signal to obtain a new positioning trajectory and may combine absolute positioning accuracy of a GNSS with local relative positioning accuracy of a sensor. This may avoid trajectory drifts caused by weak GNSS signals and positioning errors or inaccurate positioning caused by road binding or road attachment on some terminals, thereby improving accuracy of a positioning trajectory. In some areas such as intersections and forks, a real driving trajectory of a user may be more quickly and accurately determined based on more accurate positioning. This plays a role in navigation route planning, yaw judgment, road condition analysis, and other applications.

Related data, such as sensor data, position information, and moving trajectory information, is involved in some embodiments. When some embodiments are applied to a product or technology, user permission or consent should be obtained, and collection, use, and processing of related data should comply with related laws, regulations, and standards in related countries and regions.

Related data, such as satellite positioning information, is involved in some embodiments. When some embodiments are applied to a product or technology, user permission or consent should be obtained, and collection, use, and processing of related data should comply with related laws, regulations, and standards in related countries and regions.

The following further describes an exemplary structure of the data processing apparatus 455 provided in some embodiments when the apparatus is implemented as software modules. In some embodiments, as shown in FIG. 2, software modules of the object processing apparatus 455 that are stored in the memory 450 may include:

a first obtaining module 4551, configured to obtain satellite positioning information; a second obtaining module 4552, configured to obtain a sensor data set captured by a target sensor in a terminal, the sensor data set including at least an acceleration sensor data set and a gyroscope data set; a first determining module 4553, configured to determine, based on the acceleration sensor data set and the gyroscope data set, yaw angle variation information of a carrier in which the terminal is located during movement; and a first fusion module 4554, configured to fuse the satellite positioning information and the yaw angle variation information to obtain moving trajectory information of the carrier.

In some embodiments, the first determining module 4553 is further configured to: obtain initial acceleration sensor data of the terminal from the acceleration sensor data set; determine initial attitude information of the terminal relative to the carrier based on the initial acceleration sensor data; determine a conversion matrix between a carrier coordinate system and a terminal coordinate system based on the initial attitude information; obtain each piece of first gyroscope data in the gyroscope data set; and determine the yaw angle variation information of the carrier based on the conversion matrix and each piece of first gyroscope data.

In some embodiments, the initial acceleration sensor data includes initial X-axis acceleration sensor data, initial Y-axis acceleration sensor data, and initial Z-axis acceleration sensor data. Correspondingly, the first determining module 4553 is further configured to: determine an initial pitch angle of the terminal relative to the carrier based on the initial X-axis acceleration sensor data, the initial Y-axis acceleration sensor data, and the initial Z-axis acceleration sensor data; determine an initial roll angle of the terminal relative to the carrier based on the initial X-axis acceleration sensor data and the initial Z-axis acceleration sensor data; obtain a preset initial yaw angle of the terminal relative to the carrier; and determine the initial pitch angle, the initial roll angle, and the initial yaw angle as the initial attitude information.

In some embodiments, the first determining module 4553 is further configured to: determine, based on the initial pitch angle, a first rotation matrix corresponding to an X-axis, determine, based on the initial roll angle, a second rotation matrix corresponding to a Y-axis, and determine, based on the initial yaw angle, a third rotation matrix corresponding to a Z axis; and determine a product of the third rotation matrix, the second rotation matrix, and the first rotation matrix as the conversion matrix between the carrier coordinate system and the terminal coordinate system.

In some embodiments, the first determining module 4553 is further configured to: determine a transposed matrix of the conversion matrix, and determining an inverse matrix of the transposed matrix; determine each piece of second gyroscope data of the carrier based on the inverse matrix and each piece of first gyroscope data; obtain each piece of carrier yaw data from each piece of second gyroscope data, the carrier yaw data including each carrier timestamp and a carrier yaw angle corresponding to each carrier timestamp; and determine the yaw angle variation information of the carrier based on each carrier timestamp and the carrier yaw angle corresponding to each carrier timestamp.

In some embodiments, the first fusion module 4554 is further configured to: obtain start time and end time of the fusion, determine a target satellite positioning sequence based on the start time, the end time, and the satellite positioning information, and determine a target yaw angle variation sequence based on the start time, the end time, and the yaw angle variation information; determine first target trajectory point data based on first target satellite positioning data and second target satellite positioning data in the target satellite positioning sequence and first target yaw angle variation data in the target yaw angle variation sequence; determine $j^{th}$ target satellite positioning data and $(j+1)^{th}$ target satellite positioning data that correspond to $i^{th}$ target yaw angle variation data in the target yaw angle variation sequence, an $i^{th}$ carrier timestamp corresponding to the $i^{th}$ target yaw angle variation data being between a $j^{th}$ satellite timestamp corresponding to the $j^{th}$ target satellite positioning data and a $(j+1)^{th}$ satellite timestamp corresponding to the $(j+1)^{th}$ target satellite positioning data, i=2, 3, . . . , N, N being a total quantity of yaw angle variations in the target yaw angle variation sequence, and j being an integer less than or equal to i; determine offset information between an $i^{th}$ target trajectory point and an $(i-1)^{th}$ target trajectory point based on the $j^{th}$ target satellite positioning data and the $(j+1)^{th}$ target satellite positioning data in the target satellite positioning sequence and the $i^{th}$ target yaw angle variation data in the target yaw angle variation sequence; and determine $i^{th}$ target trajectory point data based on $(i-1)^{th}$ target trajectory point data and the offset information.

In some embodiments, the first fusion module 4554 is further configured to: obtain a first satellite timestamp from the first target satellite positioning data, obtain a second satellite timestamp from the second target satellite positioning data, and obtain a first carrier timestamp from the first target yaw angle variation data; when the first carrier timestamp is between the first satellite timestamp and the second satellite timestamp, determine a first fusion ratio based on the first satellite timestamp, the second satellite timestamp, and the first carrier timestamp; and fuse the first target satellite positioning data and the second target satellite positioning data based on the first fusion ratio to obtain the first target trajectory point data.

In some embodiments, the first fusion module 4554 is further configured to: fuse first position information in the first target satellite positioning data and second position information in the second target satellite positioning data based on the first fusion ratio to obtain position information of a first target trajectory point; fuse a first rate in the first target satellite positioning data and a second rate in the second target satellite positioning data based on the first fusion ratio to obtain a target rate of the first target trajectory point; obtain first direction information from the first target satellite positioning data, and obtain second direction information from the second target satellite positioning data; determine first direction difference information based on the first direction information, the second direction information, and the first fusion ratio; and determine velocity direction information of the first target trajectory point based on the second direction information and the first direction difference information.

In some embodiments, the first fusion module 4554 is further configured to: obtain the $i^{th}$ carrier timestamp from the $i^{th}$ target yaw angle variation data, and determine an $i^{th}$ time difference based on the $i^{th}$ carrier timestamp and an $(i-1)^{th}$ carrier timestamp; obtain the $j^{th}$ satellite timestamp from the $j^{th}$ target satellite positioning data, and obtain the $(j+1)^{th}$ satellite timestamp from the $(j+1)^{th}$ target satellite positioning data; determine an $i^{th}$ fusion ratio based on the $j^{th}$ satellite timestamp, the $(j+1)^{th}$ satellite timestamp, and the $i^{th}$ carrier timestamp; fuse a $j^{th}$ rate in the $j^{th}$ target satellite positioning data and a $(j+1)^{th}$ rate in the $(j+1)^{th}$ target satellite positioning data based on the $i^{th}$ fusion ratio to obtain an $i^{th}$ average rate; determine an $i^{th}$ offset distance based on the $i^{th}$ time difference and the $i^{th}$ average rate; and determine an $i^{th}$ velocity direction based on an $(i-1)^{th}$ velocity direction of the $(i-1)^{th}$ target trajectory point and an $i^{th}$ yaw angle variation angle in the $i^{th}$ target yaw angle variation data.

In some embodiments, the first fusion module 4554 is further configured to: determine candidate position information of the $i^{th}$ target trajectory point based on position information of the $(i-1)^{th}$ target trajectory point and the $i^{th}$ offset distance; determine the candidate position information of the $i^{th}$ target trajectory point, the $i^{th}$ average rate, and the $i^{th}$ velocity direction as $i^{th}$ candidate trajectory point data; and when it is determined that no error filtering fusion is to be performed, determine the $i^{th}$ candidate trajectory point data as the $i^{th}$ target trajectory point data.

In some embodiments, the first fusion module 4554 is further configured to: when it is determined that error filtering fusion is to be performed, determine a sensor error based on the first i pieces of target trajectory point data and the candidate position information; obtain a satellite accuracy estimate in the $j^{th}$ target satellite positioning data; obtain an $(i-1)^{th}$ reference error, and determine an $i^{th}$ error based on the sensor error and the $(i-1)^{th}$ reference error; determine an $i^{th}$ error fusion ratio based on the $i^{th}$ error and the satellite accuracy estimate; and fuse the $j^{th}$ target satellite positioning data and the $i^{th}$ candidate trajectory point data based on the $i^{th}$ error fusion ratio to obtain the $i^{th}$ target trajectory point data.

In some embodiments, the first fusion module 4554 is further configured to: determine an error sum of the $i^{th}$ error and the satellite accuracy estimate; and determine a quotient of the satellite accuracy estimate and the error sum as the $i^{th}$ error fusion ratio.

In some embodiments, the first fusion module 4554 is further configured to: obtain $j^{th}$ position information, $j^{th}$ direction information, and the $j^{th}$ rate in the $j^{th}$ target satellite positioning data, and obtain the candidate position information, the $i^{th}$ velocity direction, and the $i^{th}$ average rate in the $i^{th}$ candidate trajectory point data; determine a position difference between the candidate position information and the $j^{th}$ position information, determine a direction difference between the $i^{th}$ velocity direction and a $j^{th}$ direction, and determine a rate difference between the $i^{th}$ average rate and the $j^{th}$ rate; determine a sum of the $j^{th}$ position information and a product of the position difference and the $i^{th}$ error fusion ratio as target position information of the $i^{th}$ target trajectory point; determine a sum of the $j^{th}$ direction information and a product of the direction difference and the $i^{th}$ error fusion ratio as target direction information of the $i^{th}$ target trajectory point; and determine a sum of the $j^{th}$ rate and a product of the rate difference and the $i^{th}$ error fusion ratio as a target rate of the $i^{th}$ target trajectory point.

In some embodiments, the apparatus further includes: a second determining module, configured to determine a trajectory error between the moving trajectory information of the carrier and the target satellite positioning sequence; a third determining module, configured to: when it is determined that the trajectory error is greater than a preset error threshold or an accuracy estimate of the target satellite positioning sequence is less than a preset accuracy threshold, determine an actual moving trajectory of the carrier based on the moving trajectory information of the carrier; and a display module, configured to display the actual moving trajectory of the carrier, and display a path planning result obtained through path planning based on the moving trajectory information of the carrier.

According to some embodiments, each module may exist respectively or be combined into one or more modules. Some modules may be further split into multiple smaller function modules, thereby implementing the same operations without affecting the technical effects of some embodiments. The modules are divided based on logical functions.

In actual applications, a function of one module may be realized by multiple modules, or functions of multiple modules may be realized by one module. In some embodiments, the apparatus may further include other modules. In actual applications, these functions may also be realized cooperatively by the other modules, and may be realized cooperatively by multiple modules.

A person skilled in the art would understand that these "modules" could be implemented by hardware logic, a processor or processors executing computer software code, or a combination of both. The "modules" may also be implemented in software stored in a memory of a computer or a non-transitory computer-readable medium, where the instructions of each module are executable by a processor to thereby cause the processor to perform the respective operations of the corresponding module.

The descriptions of the data processing apparatus embodiment are similar to those of the foregoing methods. Accordingly, for implementation details, reference may be made to the descriptions of the method according to some embodiments.

Some embodiments provide a computer program product. The computer program product includes a computer program or computer-executable instructions. The computer program or the computer-executable instructions are stored in a computer-readable storage medium. A processor of an electronic device reads the computer-executable instructions from the computer-readable storage medium, and the processor executes the computer-executable instructions, so that the electronic device performs the data processing method in some embodiments.

Some embodiments provide a computer-readable storage medium storing computer-executable instructions. When the computer-executable instructions are executed by a processor, the processor is enabled to perform the data processing method provided in some embodiments, for example, the data processing method shown in FIG. 3A and FIG. 5B.

In some embodiments, the computer-readable storage medium may be a memory such as an FRAM, a ROM, a PROM, an EPROM, an EEPROM, a flash memory, a magnetic memory, a compact disc, or a CD-ROM; or may be various devices including one of or any combination of the foregoing memories.

In some embodiments, the computer-executable instructions may be written in the form of a program, software, a software module, a script, or code according to a programming language in any form (including a compiled or interpretive language, or a declarative or procedural language), and may be deployed in any form, including being deployed as a standalone program, or being deployed as a module, a component, a subroutine, or another unit for use in a computing environment.

In an example, the computer-executable instructions may, but not necessarily, correspond to a file in a file system, and may be stored as a part of a file that stores other programs or data, for example, stored in one or more scripts of a Hypertext Markup Language (HTML) document, stored in a single file dedicated for the discussed program, or stored in a plurality of co-files (for example, files that store one or more modules, subroutines, or code parts).

In an example, the executable instructions may be deployed on one electronic device for execution, or may be executed on a plurality of electronic devices at one location, or may be executed on a plurality of electronic devices that are distributed at a plurality of locations and that are interconnected through a communication network.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A data processing method, applied to an electronic device, comprising:

obtaining satellite positioning information;

obtaining a sensor data set captured by a target sensor in a terminal, the sensor data set comprising at least an acceleration sensor data set and a gyroscope data set;

determining, based on the acceleration sensor data set and the gyroscope data set, yaw angle variation information of a vehicle in which the terminal is located during movement, the determining the yaw angle variation information further comprising, during movement of the vehicle:

obtaining initial acceleration sensor data of the terminal from the acceleration sensor data set;

determining initial attitude information of the terminal relative to the vehicle based on the initial acceleration sensor data;

determining a conversion matrix between a vehicle coordinate system and a terminal coordinate system based on the initial attitude information;

obtaining a first plurality of pieces of first gyroscope data in the gyroscope data set; and determining the yaw angle variation information of the vehicle based on the conversion matrix and the first plurality of pieces of first gyroscope data;

fusing, during movement of the vehicle, the satellite positioning information and the yaw angle variation information to obtain moving trajectory information of the vehicle; and updating, during the movement of the vehicle, a display displaying a moving trajectory of the vehicle based on the moving trajectory information.

2. The data processing method according to claim 1, wherein the initial acceleration sensor data comprises initial X-axis acceleration sensor data, initial Y-axis acceleration sensor data, and initial Z-axis acceleration sensor data, and wherein the determining the initial attitude information comprises:

determining an initial pitch angle of the terminal relative to the vehicle based on the initial X-axis acceleration sensor data, the initial Y-axis acceleration sensor data, and the initial Z-axis acceleration sensor data;

determining an initial roll angle of the terminal relative to the vehicle based on the initial X-axis acceleration sensor data and the initial Z-axis acceleration sensor data;

obtaining a preset initial yaw angle of the terminal relative to the vehicle; and determining the initial pitch angle, the initial roll angle, and the preset initial yaw angle as the initial attitude information.

3. The data processing method according to claim 2, wherein the determining the conversion matrix comprises:

determining, based on the initial pitch angle, a first rotation matrix corresponding to an X-axis, determining, based on the initial roll angle, a second rotation matrix corresponding to a Y-axis, and determining, based on the preset initial yaw angle, a third rotation matrix corresponding to a Z axis; and determining a product of the third rotation matrix, the second rotation matrix, and the first rotation matrix as the conversion matrix between the vehicle coordinate system and the terminal coordinate system.

4. The data processing method according to claim 1, wherein the determining the yaw angle variation information of the vehicle based on the conversion matrix comprises:

determining a transposed matrix of the conversion matrix, and determining an inverse matrix of the transposed matrix;

determining a second plurality of pieces of second gyroscope data of the vehicle based on the inverse matrix and each piece of first gyroscope data;

obtaining a third plurality of pieces of vehicle yaw data from the second plurality of pieces of second gyroscope data, comprising a plurality of vehicle timestamps and a plurality of vehicle yaw angles corresponding to the plurality of vehicle timestamps; and determining the yaw angle variation information based on the plurality of vehicle timestamps and the plurality of vehicle yaw angles.

5. The data processing method according to claim 1, wherein the fusing the satellite positioning information and the yaw angle variation information comprises:

obtaining start time and end time for fusing the satellite positioning information and the yaw angle variation information;

determining a target satellite positioning sequence based on the start time, the end time, and the satellite positioning information;

determining a target yaw angle variation sequence based on the start time, the end time, and the yaw angle variation information;

determining first target trajectory point data based on first target satellite positioning data and second target satellite positioning data in the target satellite positioning sequence and first target yaw angle variation data in the target yaw angle variation sequence;

determining $j^{th}$ target satellite positioning data and $(j+1)^{th}$ target satellite positioning data that correspond to $i^{th}$ target yaw angle variation data in the target yaw angle variation sequence, an $i^{th}$ vehicle timestamp corresponding to the $i^{th}$ target yaw angle variation data being between a $j^{th}$ satellite timestamp corresponding to the $j^{th}$ target satellite positioning data and a $(j+1)^{th}$ satellite timestamp corresponding to the $(j+1)^{th}$ target satellite positioning data, wherein $i=2, 3, \ldots, N$, N being a total quantity of yaw angle variations in the target yaw angle variation sequence, and wherein j is an integer less than or equal to i;

determining offset information between an $i^{th}$ target trajectory point and an $(i-1)^{th}$ target trajectory point based on the $j^{th}$ target satellite positioning data and the $(j+1)^{th}$ target satellite positioning data in the target satellite positioning sequence and the $i^{th}$ target yaw angle variation data in the target yaw angle variation sequence; and determining $i^{th}$ target trajectory point data based on $(i-1)^{th}$ target trajectory point data and the offset information.

6. The data processing method according to claim 5, wherein the determining the first target trajectory point data comprises:

obtaining a first satellite timestamp from the first target satellite positioning data, obtaining a second satellite timestamp from the second target satellite positioning data, and obtaining a first vehicle timestamp from the first target yaw angle variation data;

based on the first vehicle timestamp being between the first satellite timestamp and the second satellite timestamp, determining a first fusion ratio based on the first satellite timestamp, the second satellite timestamp, and the first vehicle timestamp; and fusing the first target satellite positioning data and the second target satellite positioning data based on the first fusion ratio to obtain the first target trajectory point data.

7. The data processing method according to claim 6, wherein the fusing the first target satellite positioning data and the second target satellite positioning data comprises:

fusing first position information in the first target satellite positioning data and second position information in the second target satellite positioning data based on the first fusion ratio to obtain position information of a first target trajectory point;

fusing a first rate in the first target satellite positioning data and a second rate in the second target satellite positioning data based on the first fusion ratio to obtain a target rate of the first target trajectory point;

obtaining first direction information from the first target satellite positioning data, and obtaining second direction information from the second target satellite positioning data;

determining first direction difference information based on the first direction information, the second direction information, and the first fusion ratio; and determining velocity direction information of the first target trajectory point based on the second direction information and the first direction difference information.

8. The data processing method according to claim 5, wherein the determining the offset information between the $i^{th}$ target trajectory point and the $(i-1)^{th}$ target trajectory point comprises:

obtaining the $i^{th}$ vehicle timestamp from the $i^{th}$ target yaw angle variation data, and determining an $i^{th}$ time difference based on the $i^{th}$ vehicle timestamp and an $(i-1)^{th}$ vehicle timestamp;

obtaining the $j^{th}$ satellite timestamp from the $j^{th}$ target satellite positioning data, and obtaining the $(j+1)^{th}$ satellite timestamp from the $(j+1)^{th}$ target satellite positioning data;

determining an $i^{th}$ fusion ratio based on the $j^{th}$ satellite timestamp, the $(j+1)^{th}$ satellite timestamp, and the $i^{th}$ vehicle timestamp;

fusing a $j^{th}$ rate in the $j^{th}$ target satellite positioning data and a $(j+1)^{th}$ rate in the $(j+1)^{th}$ target satellite positioning data based on the $i^{th}$ fusion ratio to obtain an $i^{th}$ average rate;

determining an $i^{th}$ offset distance based on the $i^{th}$ time difference and the $i^{th}$ average rate; and determining an $i^{th}$ velocity direction based on an $(i-1)^{th}$ velocity direction of the $(i-1)^{th}$ target trajectory point and an $i^{th}$ yaw angle variation angle in the $i^{th}$ target yaw angle variation data.

9. The data processing method according to claim 8, wherein the determining the $i^{th}$ target trajectory point data comprises:

determining candidate position information of the $i^{th}$ target trajectory point based on position information of the $(i-1)^{th}$ target trajectory point and the $i^{th}$ offset distance;

determining the candidate position information of the $i^{th}$ target trajectory point, the $i^{th}$ average rate, and the $i^{th}$ velocity direction as $i^{th}$ candidate trajectory point data; and based on determining that no error filtering fusion is to be performed, determining the $i^{th}$ candidate trajectory point data as the $i^{th}$ target trajectory point data.

10. A data processing apparatus, comprising:

at least one memory configured to store computer program code; and at least one processor configured to read the program code and operate as instructed by the program code, the program code comprising:

first obtaining code configured to cause at least one of the at least one processor to obtain satellite positioning information;

second obtaining code configured to cause at least one of the at least one processor to obtain a sensor data set captured by a target sensor in a terminal, the sensor data set comprising at least an acceleration sensor data set and a gyroscope data set;

first determining code configured to cause at least one of the at least one processor to determine, based on the acceleration sensor data set and the gyroscope data set, yaw angle variation information of a vehicle in which the terminal is located during movement, the first determining code further comprising:

third obtaining code configured to cause at least one of the at least one processor to obtain initial acceleration sensor data of the terminal from the acceleration sensor data set:

second determining code configured to cause at least one of the at least one processor to determine initial attitude information of the terminal relative to the vehicle based on the initial acceleration sensor data;

third determining code configured to cause at least one of the at least one processor to determine a conversion matrix between a vehicle coordinate system and a terminal coordinate system based on the initial attitude information;

fourth obtaining code configured to cause at least one of the at least one processor to obtain a first plurality of pieces of first gyroscope data in the gyroscope data set; and fourth determining code configured to cause at least one of the at least one processor to determine the yaw angle variation information of the vehicle based on the conversion matrix and the first plurality of pieces of first gyroscope data;

first fusion code configured to cause at least one of the at least one processor to fuse, during movement of the vehicle, the satellite positioning information and the yaw angle variation information to obtain moving trajectory information of the vehicle; and display code configured to cause at least one of the at least one processor to update, during movement of the vehicle, a display of a moving trajectory of the vehicle based on the moving trajectory information.

11. The data processing apparatus according to claim 10, wherein the initial acceleration sensor data comprises initial X-axis acceleration sensor data, initial Y-axis acceleration sensor data, and initial Z-axis acceleration sensor data, and wherein the second determining code is configured to cause at least one of the at least one processor to:

determine an initial pitch angle of the terminal relative to the vehicle based on the initial X-axis acceleration sensor data, the initial Y-axis acceleration sensor data, and the initial Z-axis acceleration sensor data;

determine an initial roll angle of the terminal relative to the vehicle based on the initial X-axis acceleration sensor data and the initial Z-axis acceleration sensor data;

obtain a preset initial yaw angle of the terminal relative to the vehicle; and determine the initial pitch angle, the initial roll angle, and the preset initial yaw angle as the initial attitude information.

12. The data processing apparatus according to claim 11, wherein the third determining code is configured to cause at least one of the at least one processor to:

determine, based on the initial pitch angle, a first rotation matrix corresponding to an X-axis, determine, based on the initial roll angle, a second rotation matrix corresponding to a Y-axis, and determine, based on the preset initial yaw angle, a third rotation matrix corresponding to a Z axis; and determine a product of the third rotation matrix, the second rotation matrix, and the first rotation matrix as the conversion matrix between the vehicle coordinate system and the terminal coordinate system.

13. The data processing apparatus according to claim 10, wherein the determine the yaw angle variation information of the vehicle based on the conversion matrix comprises:

determine a transposed matrix of the conversion matrix, and determining an inverse matrix of the transposed matrix;

determine a second plurality of pieces of second gyroscope data of the vehicle based on the inverse matrix and each piece of first gyroscope data;

obtain a third plurality of pieces of vehicle yaw data from the second plurality of pieces of second gyroscope data, comprising a plurality of vehicle timestamps and a plurality of vehicle yaw angles corresponding to the plurality of vehicle timestamps; and determine the yaw angle variation information based on the plurality of vehicle timestamps and the plurality of vehicle yaw angles.

14. The data processing apparatus according to claim 10, wherein the first fusion code comprises:

third obtaining code configured to cause at least one of the at least one processor to obtain start time and end time for fusing the satellite positioning information and the yaw angle variation information;

second determining code configured to cause at least one of the at least one processor to determine a target satellite positioning sequence based on the start time, the end time, and the satellite positioning information;

third determining code configured to cause at least one of the at least one processor to determine a target yaw angle variation sequence based on the start time, the end time, and the yaw angle variation information;

fourth determining code configured to cause at least one of the at least one processor to determine first target trajectory point data based on first target satellite positioning data and second target satellite positioning data in the target satellite positioning sequence and first target yaw angle variation data in the target yaw angle variation sequence;

fifth determining code configured to cause at least one of the at least one processor to determine $j^{th}$ target satellite positioning data and $(j+1)^{th}$ target satellite positioning data that correspond to $i^{th}$ target yaw angle variation data in the target yaw angle variation sequence, an $i^{th}$ vehicle timestamp corresponding to the $i^{th}$ target yaw angle variation data being between a $i^{th}$ satellite timestamp corresponding to the $j^{th}$ target satellite positioning data and a $(j+1)^{th}$ satellite timestamp corresponding to the $(j+1)^{th}$ target satellite positioning data, wherein i=2, 3, . . . , N, N being a total quantity of yaw angle variations in the target yaw angle variation sequence, and wherein j is an integer less than or equal to i;

sixth determining code configured to cause at least one of the at least one processor to determine offset information between an $i^{th}$ target trajectory point and an $(i-1)^{th}$ target trajectory point based on the $j^{th}$ target satellite positioning data and the $(j+1)^{th}$ target satellite positioning data in the target satellite positioning sequence and the $i^{th}$ target yaw angle variation data in the target yaw angle variation sequence; and seventh determining code configured to cause at least one of the at least one processor to determine $i^{th}$ target trajectory point data based on $(i-1)^{th}$ target trajectory point data and the offset information.

15. The data processing apparatus according to claim 14, wherein the fourth determining code comprises:

fourth obtaining code configured to cause at least one of the at least one processor to obtain a first satellite timestamp from the first target satellite positioning data, obtaining a second satellite timestamp from the second target satellite positioning data, and obtaining a first vehicle timestamp from the first target yaw angle variation data;

eighth determining code configured to cause at least one of the at least one processor to, based on the first vehicle timestamp being between the first satellite timestamp and the second satellite timestamp, determine a first fusion ratio based on the first satellite timestamp, the second satellite timestamp, and the first vehicle timestamp; and second fusion code configured to cause at least one of the at least one processor to fuse the first target satellite positioning data and the second target satellite positioning data based on the first fusion ratio to obtain the first target trajectory point data.

16. The data processing apparatus according to claim 15, wherein the second fusion code is configured to cause at least one of the at least one processor to:

fuse first position information in the first target satellite positioning data and second position information in the second target satellite positioning data based on the first fusion ratio to obtain position information of a first target trajectory point;

fuse a first rate in the first target satellite positioning data and a second rate in the second target satellite positioning data based on the first fusion ratio to obtain a target rate of the first target trajectory point;

obtain first direction information from the first target satellite positioning data, and obtaining second direction information from the second target satellite positioning data;

determine first direction difference information based on the first direction information, the second direction information, and the first fusion ratio; and determine velocity direction information of the first target trajectory point based on the second direction information and the first direction difference information.

17. The data processing apparatus according to claim 14, wherein the sixth determining code is configured to cause at least one of the at least one processor to:

obtain the $i^{th}$ vehicle timestamp from the $i^{th}$ target yaw angle variation data, and determining an $i^{th}$ time difference based on the $i^{th}$ vehicle timestamp and an $(i-1)^{th}$ vehicle timestamp;

obtain the $j^{th}$ satellite timestamp from the $j^{th}$ target satellite positioning data, and obtaining the $(j+1)^{th}$ satellite timestamp from the $(j+1)^{th}$ target satellite positioning data;

determine an $i^{th}$ fusion ratio based on the $j^{th}$ satellite timestamp, the $(j+1)^{th}$ satellite timestamp, and the $i^{th}$ vehicle timestamp;

fuse a $j^{th}$ rate in the $j^{th}$ target satellite positioning data and a $(j+1)^{th}$ rate in the $(j+1)^{th}$ target satellite positioning data based on the $i^{th}$ fusion ratio to obtain an $i^{th}$ average rate;

determine an $i^{th}$ offset distance based on the $i^{th}$ time difference and the $i^{th}$ average rate; and determine an $i^{th}$ velocity direction based on an $(i-1)^{th}$ velocity direction of the $(i-1)^{th}$ target trajectory point and an $i^{th}$ yaw angle variation angle in the $i^{th}$ target yaw angle variation data.

18. A non-transitory computer-readable storage medium, storing computer code which, when executed by at least one processor, causes the at least one processor to at least:

obtain satellite positioning information;

obtain a sensor data set captured by a target sensor in a terminal, the sensor data set comprising at least an acceleration sensor data set and a gyroscope data set;

determine, based on the acceleration sensor data set and the gyroscope data set, yaw angle variation information of a vehicle in which the terminal is located during movement, the determination of the yaw angle variation information further comprising, during movement of the vehicle:

obtain initial acceleration sensor data of the terminal from the acceleration sensor data set;

determine initial attitude information of the terminal relative to the vehicle based on the initial acceleration sensor data;

determine a conversion matrix between a vehicle coordinate system and a terminal coordinate system based on the initial attitude information;

obtain a first plurality of pieces of first gyroscope data in the gyroscope data set; and determine the yaw angle variation information of the vehicle based on the conversion matrix and the first plurality of pieces of first gyroscope data;

fuse, during movement of the vehicle, the satellite positioning information and the yaw angle variation information to obtain moving trajectory information of the vehicle; and updating, during movement of the vehicle, a display of a moving trajectory of the vehicle based on the moving trajectory information.

* * * * *